United States Patent
Medard et al.

(10) Patent No.: US 11,575,777 B2
(45) Date of Patent: Feb. 7, 2023

(54) ADAPTIVE CAUSAL NETWORK CODING WITH FEEDBACK

(71) Applicant: Massachusetts Institute of Technology, Cambridge, MA (US)

(72) Inventors: Muriel Medard, Belmont, MA (US); Derya Malak, Boston, MA (US); Alejandro Cohen, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/884,436

(22) Filed: May 27, 2020

(65) Prior Publication Data

US 2020/0382625 A1 Dec. 3, 2020

Related U.S. Application Data

(60) Provisional application No. 62/853,090, filed on May 27, 2019.

(51) Int. Cl.
*H04L 69/324* (2022.01)
*H04L 1/00* (2006.01)
(Continued)

(52) U.S. Cl.
CPC .......... *H04L 69/324* (2013.01); *H04L 1/004* (2013.01); *H04L 1/1867* (2013.01)

(58) Field of Classification Search
None
See application file for complete search history.

(56) References Cited

U.S. PATENT DOCUMENTS

| 6,075,812 A | 6/2000 | Cafarella et al. |
| 8,130,776 B1 * | 3/2012 | Sundararajan .......... H04L 47/27 370/401 |

(Continued)

FOREIGN PATENT DOCUMENTS

| WO | WO 2010/025362 | 3/2010 |
| WO | WO-2018183694 A1 * | 10/2018 ........... H04L 1/0041 |

OTHER PUBLICATIONS

Cohen, et al., "Adaptive Causal Network Coding with Feedback;" IEEE Transactions on Communications, vol. 68. No. 7; Jul. 2020; 17 Pages.

(Continued)

*Primary Examiner* — Jay L Vogel
(74) *Attorney, Agent, or Firm* — Daly, Crowley, Mofford & Durkee, LLP

(57) ABSTRACT

Techniques are disclosed for an adaptive and causal random linear network coding (AC-RLNC) with forward error correction (FEC) for a communication channel with delayed feedback. An example methodology implementing the techniques includes transmitting one or more coded packets in a communication channel, determining a channel behavior of the channel, and adaptively adjusting a transmission of a subsequent coded packet in the first channel based on the determined channel behavior. The communication channel may be a point-to-point communication channel between a sender and a receiver. The channel behavior may be determined based on feedback acknowledgements provided by the receiver. The subsequent coded packet may be a random linear combination of one or more information packets.

12 Claims, 10 Drawing Sheets

(51) Int. Cl.
  *H04L 1/18* (2006.01)
  *H04L 47/38* (2022.01)
  *H04W 28/02* (2009.01)
  *H04W 40/12* (2009.01)
  *H04L 1/12* (2006.01)
  *H04L 45/24* (2022.01)
  *H04L 45/00* (2022.01)

(56) References Cited

U.S. PATENT DOCUMENTS

| | | | | |
|---|---|---|---|---|
| 9,025,607 | B2* | 5/2015 | Zeger | H04W 4/06 370/400 |
| 9,185,529 | B2* | 11/2015 | Medard | H04W 40/00 |
| 9,992,126 | B1* | 6/2018 | Ho | H04L 47/27 |
| 10,904,367 | B2 | 1/2021 | Goel et al. | |
| 2001/0048709 | A1* | 12/2001 | Hoffmann | G11B 20/1833 375/130 |
| 2003/0005387 | A1* | 1/2003 | Tsunoda | H03M 13/00 714/785 |
| 2003/0050086 | A1* | 3/2003 | Lee | H04W 52/325 455/522 |
| 2005/0042985 | A1* | 2/2005 | Cheng | H04L 1/1867 455/24 |
| 2007/0121639 | A1* | 5/2007 | Degrande | H04L 1/1812 370/394 |
| 2008/0144562 | A1 | 6/2008 | Draper et al. | |
| 2009/0175214 | A1 | 7/2009 | Sfar et al. | |
| 2010/0124196 | A1* | 5/2010 | Bonar | H04W 16/16 370/329 |
| 2010/0254446 | A1 | 10/2010 | Khayrallah et al. | |
| 2011/0103377 | A1* | 5/2011 | Hua | H04L 65/1053 370/352 |
| 2013/0195106 | A1* | 8/2013 | Calmon | H04L 45/24 370/389 |
| 2015/0149870 | A1 | 5/2015 | Kozat | |
| 2015/0180613 | A1* | 6/2015 | Yang | H04L 1/1874 370/328 |
| 2016/0191402 | A1* | 6/2016 | Anderson | H04L 47/25 370/236 |
| 2017/0012861 | A1 | 1/2017 | Blumenthal et al. | |
| 2017/0012885 | A1 | 1/2017 | Ho | |
| 2017/0111856 | A1* | 4/2017 | Rajendran | H04L 5/006 |
| 2017/0111934 | A1* | 4/2017 | Wang | H04W 76/25 |
| 2017/0117987 | A1* | 4/2017 | Park | H04L 1/0075 |
| 2017/0279558 | A1* | 9/2017 | Badr | H04L 47/22 |
| 2018/0139140 | A1 | 5/2018 | Gholmieh et al. | |
| 2018/0284735 | A1 | 10/2018 | Cella et al. | |
| 2019/0339688 | A1 | 11/2019 | Cella et al. | |

OTHER PUBLICATIONS

PCT International Preliminary Report dated Feb. 11, 2021 for International Application No. PCT/US2019/044346; 11 pages.
Adya, et al., "A Multi-Radio Unification Protocol for IEEE 802.11 Wireless Networks;" Technical Report MSR-TR-2003-44; Microsoft Research, Microsoft Corporation; Jul. 2003; 15 Pages.
Ahlswede, et al., "Network Information Flow;" IEEE Transactions on Information Theory; vol. 46, No. 4; Jul. 2000; 13 Pages.
Arzani, et al., "Impact of Path Characteristics and Scheduling Policies on MPTCP Performance;" Conference: 2014 28th International Conference on Advanced Information Networking and Applications Workshops (WAINA); May 2014; 6 Pages.
Aven, "Upper (Lower) Bounds on the Mean of the Maximum (Minimum) of a Number of Random Variables;" Journal of Applied Probability; vol. 22, No. 3; Sep. 1985; 7 Pages.
Choi, et al., "Optimal Load Balancing Scheduler for MPTCP-Based Bandwidth Aggregation in Heterogeneous Wireless Environments;" Computer Communications, vol. 112; Sep. 1, 2017; 16 Pages.
Cloud, et al., "Multi-Path Low Delay Network Codes;" retrieved from https://www.researchgate.net/publication/307603998; Sep. 2016; 8 Pages.
Cloud, et al., "Multi-Path TCP with Network Coding for Mobile Devices in Heterogeneous Networks;" Vehicular Technology Conference; Jun. 2013; 6 Pages.
Cui, et al., "Innovating Transport with QUIC: Design Approaches and Research Challenges;" IEEE Computer Society; Downloaded on Jun. 3, 2020; 5 Pages.
De Coninck, et al., "Multipath QUIC: Design and Evaluation;" Association for Computing Machinery; Dec. 12, 2017; 7 Pages.
Eryilmaz, et al., "On Delay Performance Gains From Network Coding (Invited Paper);" retrieved from https://www.researchgate.net.publication/242186505; Jan. 30, 2014; 8 Pages.
Ford, et al., "TCP Extensions for Multipath Operation with Multiple Addresses;" Internet Engineering Task Force (IETF); Jan. 2013; 128 Pages.
Fragouli, et al., "Network Coding: An Instant Primer;" retrieved from https://www.researchgate.net/publication/37427707; 8 Pages.
Frommgen, et al., "Multipath TCP Scheduling for Thin Streams: Active Probing and One-way Delay-awareness;" Proceedings of the IEEE ICC, May 2018; 7 Pages.
Gabriel, et al., "Mulitpath Communication with Finite Sliding Window Network Coding for Ultra-Reliability and Low Latency;" retrieved from arXiv:1802.00521v1; Feb. 2, 2018; 6 pages.
Ghaderi, et al., "Hierarchical Cooperation in Ad Hoc Networks: Optimal Clustering and Achievable Throughput;" IEEE Transactions on Information Theory, vol. 55, No. 8; Aug. 2009; 12 Pages.
Grabner, et al., Maximum Statistics of N Random Variables Distributed by the Negative Binomial Distribution; Downloaded from https://www.cambridge.org/core; Oct. 11, 1995; 5 Pages.
Hasan, et al., "Enhancing Rural Connectivity with Software Defined Networks;" retrieved from https://www.researchgate.net/publicaton/262329667; Jan. 11, 2013; 3 Pages.
Hasslinger, et al., "The Gilbert-Elliott Model for Packet Loss in Real Time Services on the Internet;" retrieved from https://www.researchgate.net/publication/221440836; Jan. 2008; 16 Pages.
Ho, et al., "A Random Linear Network Coding Approach to Multicast;" IEEE Transactions on Information Theory, vol. 52, No. 10; Oct. 2006; 19 Pages.
Ho, et al., "The Benefits of Coding over Routing in a Randomized Setting;" retrieved from https://www.researchgate.net/publication/2565227; Apr. 2003; 7 Pages.
IETF, "Quic Working Group;" Downloaded from https://datatracker.ietf.org/wg/quic/about/; Mar. 9, 2020; 4 Pages.
Ishmael, et al., "Deploying Rural Community Wireless Mesh Networks;" IEEE Internet Computing; retrieved from https://www.researchgate.net/publication/3420079; Aug. 2008; 10 Pages.
Koetter, et al., "An Algebraic Approach to Network Coding;" IEEE/ACM Transactions on Networking; vol. 11, No. 5; Oct. 2003; 15 Pages.
Kuhn, et al., "DAPS: Intelligent Delay-Aware Packet Scheduling for Multipath Transport;" Downloaded from https://www.researchgate.net/publication/260133984_DAPS_Intelligent_Delay-Aware_Packet_Scheduling_For_Multipath_Transport; Jun. 2014; 7 Pages.
Kurant, "Exploiting the Path Propagation Time Differences in Multipath Transmission with FEC;" IEEE Journal on Selected Areas in Communications; vol. 29, No. 5; May 2011; 12 Pages.
Langley, et al., "The QUIC Transport Protocol: Design and Internet-Scale Deployment;" retrieved from https://www.researchgate.net/publication/318914953; Aug. 2017; 15 Pages.
Lim, et al., "ECF An MPTCP Path Scheduler to Manage Heterogeneous Paths;" Downloaded from https://dl.acm.org/doi/10.1145/3078505.3078552; Jun. 2017; 2 Pages.
Lun, et al., "An Analysis of Finite-Memory Random Linear Coding on Packet Streams;" retrieved from https://www.researchgate.net/publication/37443486; Apr. 2006; 7 Pages.
Lun, et al., "On Coding for Reliable Communication over Packet Networks;" retrieved from arXiv:cs/0510070v3; Jan. 2, 2007; 33 Pages.
Lun, et al., Achieving Minimum-Cost Multicast: A Decentralized Approach Based on Network Coding; Conference Paper in Proceedings—IEEE INFOCOM; retrieved from https://www.researchgate.net/pubication/4165607; Apr. 2005; 11 Pages.
Mahmoud, et al., "Secure and Reliable Routing Protocols for Heterogeneous Multihop Wireless Networks;" IEEE Transactions

(56) References Cited

OTHER PUBLICATIONS on Parallel and Distributed Systems; retrieved from https://www.cae.tntech.edu/~mmahmoud/publications_files/Journals/routing.pdf; Jul. 15, 2020; 11 Pages.

Malak, et al., "Multi-Hop Coding and Multi-Path Scheduling for Delay Constrained Wireless Networks;" Downloaded on Jan. 1, 2020; 10 Pages.

"Matlab—Optimization Toolbox," https://www.mathworks.com/help/optim/ug/fmincon.html; Downloaded on Aug. 20, 2018; 2 Pages.

"MultiPath TcP—Linux Kernel Implementation" Downloaded from https://multipath-tcp.org/pmwiki.php/Users/ConfigureMPTCP on Jan. 1, 2020; 6 Pages.

Othmen, et al., Secure and Reliable Multi-Path Routing Protocol for Multi-Hop Wireless Networks; *Ad Hoc & Sensor Wireless Networks*; vol. 36; Aug. 9, 2015; 22 Pages.

Ozgur, et al., Hierarchical Cooperation Achieves Optimal Capacity Scaling in Ad Hoc Networks; retrieved from arXiv:cx/0611070v4; Jun. 12, 2007; 57 Pages.

Paasch, et al., "Experimental Evaluation of Multipath TCP Schedulers;" Downloaded from http://dx.doi.org/10.1145/2630088.2631977; Aug. 18, 2014; 6 Pages.

Paasch, et al., "Exploring Mobile/WiFi Handover with Multipath TCP;" Downloaded from https://inl.info.ucl.ac.be/system/files/cell06-paasch.pdf on Aug. 13, 2012; 6 Pages.

Paasch, et al., "IOS & Linux Implementation Updates;" Downloaded from https://www.ietf.org/proceedings/99/slides/slides-99-mptcp-sessa-ios-linux-implementation-updates-00 on Jan. 1, 2020; 9 Pages.

Paasch, et al., "MultiPath TCP—Linux Kernel Implementation;" Downloaded from http://www.multipath-tcp.org/ on Jan. 1, 2020; 3 Pages.

Raiciu, et al., "How Hard Can It Be? Designing and Implementing a Deployable Multipath TCP;" Downloaded from https://www.cs.princeton.edu/courses/archive/fall17/cos561/papers/MPTCP12.pdf on Jan. 1, 2020; 14 Pages.

Sun, et al., "Multipath IP Routing on End Devices: Motivation, Design, and Performance" retrieved from https://www.researchgate.net/publication/319898690; Sep. 2017; 10 Pages.

Sundararajan, et al.; "Network Coding Meets TCP: Theory and Implementation;" Article in Proceedings of the IEEE; retrieved from https://www.researchgate.net/publication/224211936; Apr. 2011; 24 Pages.

Szabo, et al., "Network Coding as a Service;" retrieved from arXiv:1601.03201v1; Jan. 13, 2016; 12 Pages.

Wang, et al., "OSIA: Out-of-order Scheduling for In-order Arriving in concurrent multi-path transfer;" Journal of Network and Computer Applications; vol. 35, Issue 2; Mar. 2012; 11 Pages.

"Yalmip." Downloaded from https://yalmip.github.io/; Jan. 16, 2020; 5 Pages.

"Yalmip Global Optimization" Downloaded from https://yalmip.github.io/tutorial/globaloptimization/ on Sep. 17, 2016; 12 Pages.

"Yalmip—integer programming;" Downloaded from https://yalmip.github.io/tutorial/integerprogramming/; Sep. 17, 2016; 6 Pages.

Yang, et al., "A Scheduler for Multipath TCP;" Downloaded from https://www.researchgate.net/publication/261484897_A_scheduler_for_multipath_TCP; Jul. 2013; 7 Pages.

Zaidi, et al., "Wireless Multihop Backahauls for Rural Areas: A Preliminary Study;" PLOS ONE; https://doi.org/10.1371/journal.pone.0175358; Apr. 12, 2017; 32 Pages.

Zeng, et al., "Joint Coding and Scheduling Optimization in Wireless Systems with Varying Delay Sensitivies;" retrieved from arXiv:1202.0784v1; Feb. 3, 2012; 10 Pages.

PCT International Search Report and Written Opinion dated Nov. 5, 2019 for International Application No. PCT/US2019/044346; 17 Pages.

Cloud, et al., "Multi-Path Low Delay Network Codes;" 2016 IEEE Global Communications Conference (GLOBECOM); Dec. 4, 2016; 7 Pages.

Wu, et al., "Adaptive Flow Assignment and Packet Scheduling for Delay-Constrained Traffic Over Heterogeneous Wireless Networks;" IEEE Transactions on Vehicular Technology; vol. 65, No. 10; Oct. 2016; 7 Pages.

Zeng, et al., "Joint Coding and Scheduling Optimization in Wireless Systems with Varying Delay Sensitivities;" 2012 $9^{th}$ Annual IEEE Communications Society Conference on Sensor, Mesh, and Ad Hoc Communications and Networks (SECON); Jun. 18, 2012; 9 Pages.

PCT International Invitation to Pay Additional Fees dated Sep. 16, 2020 for International Application No. PCT/US2020/034623; 18 Pages.

PCT International Search Report and Written Opinion dated Nov. 6, 2020 for International Application No. PCT/US2020/034623; 22 Pages.

Gharsellaoui, et al., "Adaptive Network Coding Schemes for Satellite Communications;" Conference: 2016 8th Advanced Satellite Multimedia Systems Conference and the 14th Signal Processing for Space Communications Workshop (ASMS/SPSC ); Sep. 2016; 7 Pages.

U.S. Non-Final Office Action dated Mar. 18, 2021 for U.S. Appl. No. 16/758,210; 25 pages.

International Preliminary Report on Patentability dated Nov. 16, 2021 for Application No. PCT/US2020/034623; 13 Pages.

* cited by examiner

ADAPTIVE CAUSAL NETWORK CODING WITH FEEDBACK

CROSS-REFERENCE TO RELATED APPLICATION

This application claims the benefit of and priority to U.S. Provisional Application No. 62/853,090, filed on May 27, 2019, which is herein incorporated by reference in its entirety.

STATEMENT REGARDING FEDERALLY SPONSORED RESEARCH

This invention was made with Government support under HR0011-17-C-0050 awarded by the Defense Advanced Research Projects Agency (DARPA). The government has certain rights in the invention.

BACKGROUND

As is known in the art, some communication applications, such as streaming communication applications, require transmissions having low delays. There is, however, a trade-off between throughput and transmission delay which may prevent low delays from being achieved using very large data block lengths. Thus, classical approaches to information theory problems, which typically consider data block lengths to achieve desired communication rates (i.e. throughput), do not provide the desired trade-off between the throughput and the delay required for streaming communication applications.

Various forward error correction (FEC) techniques for packet-level coding have been proposed in attempts to address the problem of large in-order packet delivery delays. The challenges associated with packet-level coding are multifold due to a number of factors including, but not limited to, feedback, real-time delivery, and congestion characteristics. The challenge becomes even greater in the presence of round-trip time (RTT) fluctuations and variations in channel state (e.g. erasure bursts). When these factors are considered in conjunction with real-time transmission constraints, it becomes difficult to satisfy both a desired throughput and desired in-order delivery delay characteristics. This is particularly true in streaming communication applications requiring low transmission delays. Conventional techniques address only some of the challenges, such as reducing the in-order delivery delay to provide a desired reliability-delay trade off. Furthermore, the coding in such conventional techniques is, in general, performed in a deterministic manner, which deteriorates performance when a channel is bursty, an RTT fluctuates, or real-time transmission constraints are imposed.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a computer implemented method to provide adaptive causal network coding may include transmitting, by a sender, one or more coded packets in a first communication channel, determining a channel behavior of the first channel, and adaptively adjusting a transmission of a subsequent coded packet in the first channel based on the determined channel behavior.

In one aspect, the first communication channel includes a point-to-point communication channel between the sender and a receiver.

In one aspect, determining a channel behavior of the first channel includes determining an average erasure rate of the first channel.

In one aspect, the channel behavior of the first channel is determined based on feedback acknowledgements received over a second channel.

In one aspect, the feedback acknowledgements are one or more of an acknowledgment (ACK) and a negative acknowledgement (NACK).

In one aspect, determining a channel behavior of the first channel includes estimating the channel behavior of the first channel.

In one aspect, the first channel is a binary erasure channel (BEC).

In one aspect, the method may also include, by the sender, adding degrees of freedom (DoF) based on the determined channel behavior of the first channel.

In one aspect, the DoF is added via an a priori FEC mechanism and a posteriori FEC mechanism.

In one aspect, the subsequent coded packet is a random linear combination of one or more information packets.

In one aspect, a number of information packets included in the random linear combination is based on a retransmission criterion.

In one aspect, a number of information packets included in the random linear combination is bounded.

According to another illustrative embodiment provided to illustrate the broader concepts described herein, a computer implemented method to provide adaptive causal network coding in a multipath (MP) communication channel may include transmitting, by a sender, one or more coded packets in a multipath (MP) communication channel comprising a plurality of paths, and determining an estimate of a total rate of the plurality of paths. The method may also include, responsive to a determination that a retransmission is needed, determining at least a first path of the plurality of paths on which to send a new coded packet of information, and determining at least a second path of the plurality of paths on which to send a retransmission of a forward error correction (FEC) packet, wherein the determination that a retransmission is needed is based on the estimate of the total rate of the plurality of paths.

In one aspect, determination that a retransmission is needed is based on a check of the estimate of the total rate against a retransmission criterion.

In one aspect, the estimate of the total rate is determined based on feedback acknowledgements received by the sender.

In one aspect, determining at least the first path and determining at least the second path is via a bit-filling process configured to maximize throughput and minimize delay on the MP communication channel.

In one aspect, the new coded packet is a random linear combination of one or more information packets.

In one aspect, the FEC packet is a random linear combination of one or more information packets.

According to another illustrative embodiment provided to illustrate the broader concepts described herein, a computer implemented method to provide adaptive causal network coding in a multi-hop (MH) multipath (MP) communication channel may include, by an intermediate node in the MH MP communication channel, determining respective rates for a plurality of incoming local paths, determining respective rates for a plurality of outgoing local paths, and pairing the plurality of incoming local paths with respective outgoing local paths based on a similarity of the determined rates of the plurality of incoming local paths and the plurality of outgoing local paths.

In one aspect, the rates of the plurality of incoming local paths and the plurality of outgoing local paths are based on feedback acknowledgements.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
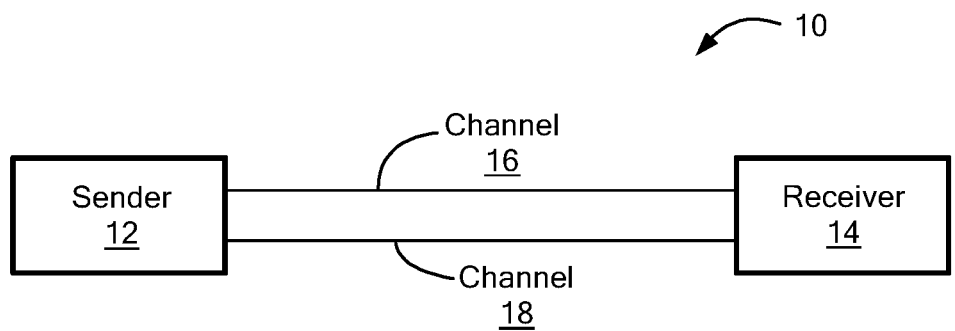
FIG. 1 is a block diagram of an example system in which the concepts described herein may be practiced, in accordance with an embodiment of the present disclosure.

Concepts, devices, systems, and techniques are disclosed for an adaptive and causal random linear network coding (AC-RLNC) with forward error correction (FEC) for a communication channel with delayed feedback. In embodiments, the AC-RLNC scheme disclosed herein may provide adaptive and causal code construction for packet scheduling over a communication channel such as, for example, a point-to-point communication channel. AC-RLNC is adaptive to the channel conditions that are learned from feedback acknowledgements. AC-RLNC is causal as coding is based on particular erasure realizations as reflected in the feedback acknowledgements. Simply stated, AC-RLNC can track the erasure pattern of the channel, and adaptively adjust its retransmission rates a priori and posteriori based on the channel quality (e.g., erasure burst pattern) and the feedback acknowledgements. These and other advantages, configurations, modifications, and embodiments will be apparent in light of this disclosure. Although particular examples are described herein, after reading the disclosure provided herein, those of ordinary skill in the art will recognize that the concepts, devices, systems, and techniques disclosed herein for AC-RLNC with FEC may also be applied to more general channel models.

As used herein, the term "in-order delivery delay" (or D) refers to the difference between the time an information packet is first transmitted in a coded packet by a sender and the time that the same information packet is decoded, in order at a receiver, and successfully acknowledged. The in-order delivery delay, D, also includes the decoding delay of packets at the receiver. In embodiments, the decoding may be via Gaussian elimination. For instance, for random linear (network) coding, given a large enough field $\mathbb{F}_z$, where z is the field size, the receiver can decode a generation of k packets with high probability, through Gaussian elimination performed on the linear system formed on any k coded packets. Hence, the mean in-order delivery delay, $D_{mean}$, is the average value of D. The metric $D_{mean}$ may be of interest in reducing the overall completion delay of all packets, such as in file downloads. Also, the maximum in-order delivery delay, $D_{max}$, is the maximum value of D among all the information packets in the stream. The metric $D_{max}$ may be of interest in reducing the maximum inter-arrival time between any two packets with new information, which may be critical for real-time applications, such as, for example, video streaming, conference calls, and distributed systems in which real-time decisions are taken according to information received from another source in the system.

As used herein, the term "throughput" (or η) refers to the total amount of information (in bits/second) delivered, in order at the receiver in n transmissions over the forward channel. The normalized throughput is the total amount of information delivered, in order at the receiver divided by n and the size of the packets.

Referring now to FIG. 1, shown is diagram of an example system 10 in which the concepts described herein may be practiced, in accordance with an embodiment of the present disclosure. As shown, system 10 includes a sender computing device (also referred to herein as a "sender") 12 and a receiver computing device (also referred to herein as a "receiver") 14. Sender computing device 12 may be any device capable of communicating data packets to another device, such as receiver computing device 14, for instance. Similarly, receiver computing device 14 may be any device capable of receiving data packets from another device, such as sender computing device 12, for instance. Nonlimiting examples of sender 12 and receiver 14 include network systems or network nodes, such as data communication equipment (e.g., hub, router, gateway, bridge, or switch) and data terminal equipment (e.g., client computer, host computer, server computer).

As shown in FIG. 1, in one example embodiment, sender computing device 12 may transmit a coded packet to receiver computing device 14 over a data channel 16. In this example, data channel 16 may be referred to as a forward channel. Receiver computing device 14 may transmit an acknowledgement (e.g., ACK or NACK) to sender computing device 12 over a data channel 18 to acknowledge the coded packet transmitted by sender computing device 12. In this example, data channel 18 may be referred to as a feedback channel. Note that receiver computing device 14 may transmit an acknowledgement to sender computing device 12 over the feedback channel for each coded packet transmitted by sender computing device 12 to receiver computing device 14. Data channels 16 and 18 may each be any channel known in the art for communicating data packets, including analog and digital channels, and combinations of such channels including the Internet.

FIGS. 3, 3, 4A, 4B and 7 are flow diagrams which illustrate example processes which may be performed within a system such as the system of FIG. 1. Rectangular elements in FIGS. 3, 3, 4A, 4B and 7 (such as element 202 in FIG. 2) are herein denoted "processing blocks," and represent computer software instructions or groups of instructions. Hexagonal elements in FIGS. 3, 3, 4A, 4B and 7 (such as element 402 in FIG. 4) are herein denoted "decision blocks," and represent computer software instructions or groups of instructions which affect the execution of the computer software instructions represented by the processing blocks. Alternatively, the processing blocks may represent steps or processes performed by functionally equivalent circuits such as a digital signal processor circuit or an application specific integrated circuit (ASIC). The flow diagrams do not depict the syntax of any particular programming language, but rather illustrates the functional information one of ordinary skill in the art requires to fabricate circuits or to generate computer software to perform the processing described. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered, meaning that, when possible, the functions represented by the blocks can be performed in any convenient or desirable order.

Figure 2:
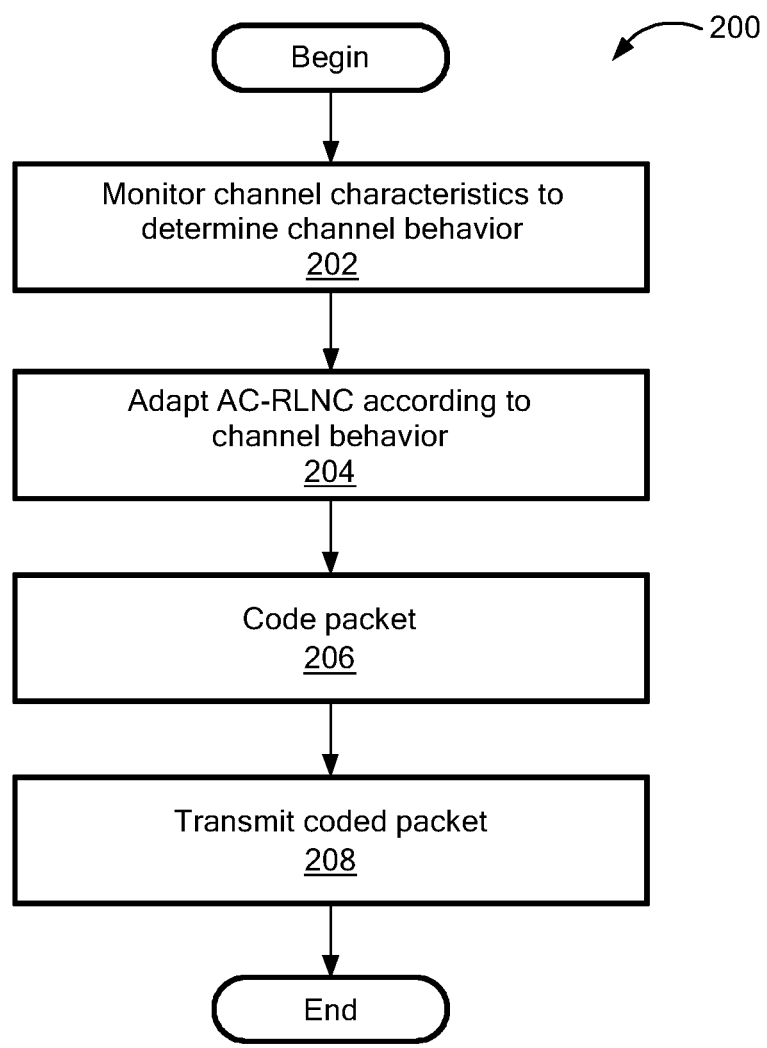
FIG. 2 is a flow diagram illustrating an example workflow for an adaptive and causal random linear network coding (AC-RLNC) scheme, in accordance with an embodiment of the present disclosure.

Turning now to FIG. 2, shown is an example workflow 200 for an illustrative adaptive and causal random linear network coding (AC-RLNC) scheme. In an embodiment, workflow 200 may be performed by a sender to schedule packets for sending over a point-to-point communication channel to a receiver. For example, in an implementation, the sender may incorporate the AC-RLNC scheme as part of a network transport layer protocol (e.g., Transmission Control Protocol/Internet Protocol (TCP/IP) or Opens Systems Interconnection (OSI) transport layer). With reference to workflow 200, characteristics of a channel can be monitored by a sender to determine or otherwise estimate the channel behavior (202). After the channel behavior has been determined, the sender can adapt the AC-RLNC according to the determined channel behavior (204). Once the AC-RLNC has been adapted, a packet can be coded (206) using AC-RLNC, and the sender can transmit (208) the coded packet to the receiver.

In an example scenario of workflow 200, and in accordance with an embodiment, in each time slot t the sender transmits a coded packet $c_t$ over the forward channel to the receiver. The receiver, over a feedback channel, acknowledges the sender for each coded packet transmitted. In the discussion that follows, unless context dictates otherwise, it will be assumed that, in the point-to-point communication channel between the sender and the receiver, erasures may occur over the forward channel. Also, for clarity, it will be assumed that the feedback channel is noiseless.

Given these assumptions, the transmission delay of a packet, $t_d$, can be defined as follows:

$$t_d = |c_t|/r, \qquad [1]$$

where $|c_t|$ is the size of the coded packet in bits, and r is the rate of the channel in bits/second. Stated simply, since the sender transmits one coded packet per time slot, the transmission delay of a packet, $t_d$, is the duration of the time slot. Assuming that the size of an acknowledgement is negligible compared to the packet size, a round trip time, RTT, can be defined as follows:

$$RTT = t_d - 2t_p, \qquad [2]$$

where $t_p$ is the maximum propagation delay over any channel. Thus, for each t-th coded packet the sender transmits, the sender receives a reliable ACK(t) or NACK(t) after RTT. In other words, the feedback acknowledgements are in the form of ACK's or NACK's which are successfully delivered after one RTT.

In the example scenario, the forward channel is assumed to be a binary erasure channel (BEC) having an i.i.d erasure probability of $\epsilon$ per transmission slot. Thus, on average, $n(1-\epsilon)$ slots, where n is the total number of transmission slots, are not erased and are available to the receiver.

Note, however, that the concepts, devices, systems, and techniques disclosed herein for AC-RLNC with FEC may be applied to other types of communication channels. For instance, in another embodiment, the forward channel may be a Gilbert-Elliott (GE) channel with erasures. A GE channel model provides a binary-state Markov process with good (G) and bad (B) states. The GE model introduces burst error patterns in transmission channels, and hence isolates erasures. A probability transition matrix, P, of a GE channel may be defined as follows:

$$P = \begin{bmatrix} 1-q & q \\ s & 1-s \end{bmatrix}, \qquad [3]$$

where the first row represents the transition probability from the good state, and the second row represents the transition probability from the bad state. In equation [3], q is the probability, from 0 to 1, that the previous state is bad and the next (i.e., following) state is good, and s is the probability, from 1 to 1, that both the previous and next states are bad. The stationary distribution satisfies $$\pi_G = \frac{s}{q+s} \text{ and } \pi_B = 1 - \pi_G,$$

where $\pi_G$ represents the stationary distribution of good states and $\pi_B$ represents the stationary distribution of bad states. Letting $\epsilon_G = 0$ be the erasure rate at the good state and $\epsilon_B = 1$ be the erasure rate at the bad state, the average erasure rate is given by $\epsilon = \pi_B$. Note that the average erasure burst is given by 1/s. Hence, burst erasures occur when s is low.

In any case, in embodiments, with parameters r, n, and RTT, an objective of AC-RLNC is to minimize the in-order delivery delay, D, and maximize the throughput, $\eta$.

Figure 3:
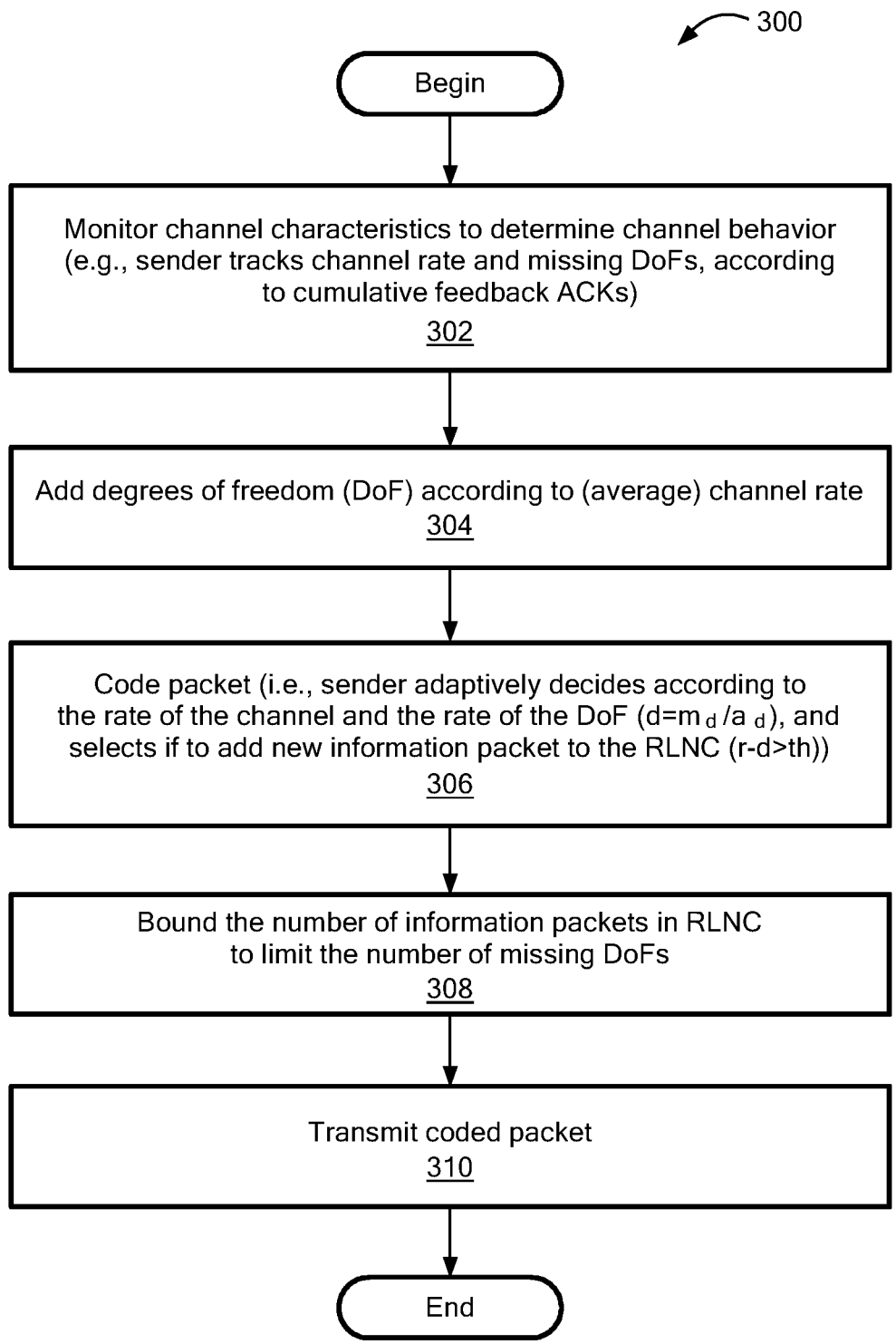
FIG. 3 is a flow diagram showing further details of the workflow of FIG. 2, in accordance with an embodiment of the present disclosure.

Referring now to FIG. 3, shown is a workflow 300 that includes further details of workflow 200 of FIG. 2. Recall from above that the sender may be scheduling packets for sending over a point-to-point communication channel to the receiver. As shown, the sender may monitor the characteristics of a channel to determine or otherwise estimate the channel behavior (302). For a noiseless feedback channel, the receiver reliably transmits ACK(t) or NACK(t) after RTT for each t-th coded packet transmitted by the sender. Hence, upon the acknowledgements, the sender can track the actual rate of the channel and the DoF rate, $d=m_d/a_d$, where $m_d$ denotes the number of DoFs needed by the receiver to decode $c_t$, which is the coded packet transmitted by the sender at time slot t, and $a_d$ denotes the number of DoFs added to $c_t$.

In embodiments, the sender can estimate the actual channel behavior (i.e., erasure probability and its variance, and the burst pattern) using the feedback acknowledgements in order to adapt the AC-RLNC. In the case of the forward channel being a BEC, the sender can count the actual number of erasures e at each time slot t. However, the number e is an estimate since it is computed based on the acknowledgements corresponding to time t–RTT. If there was no delay in the sender's estimate, it would achieve capacity. The sender can also keep an estimate of the standard deviation of erasures due to the errors estimation caused by the round-trip delay. The probability of erasure at slot t, $p_e=e/(t-RTT)$, is the fraction of erasures over the time interval [1, t–RTT]. Hence, the sender can compute the channel rate as $r=1-p_e$, and the standard deviation for BEC as $\sqrt{p_e(1-p_e)}$. In the case of the forward channel being a GE channel, the sender can estimate the actual burst pattern of the channel to adapt the AC-RLNC.

In an implementation, the sender may calculate or otherwise determine $m_d$ in order to manage the delay-throughput tradeoff as follows:

$$m_d = \#\{t: (t \in \mathcal{N} \wedge t \notin FB\text{-}\mathcal{F} \wedge t \notin \mathcal{F}) \wedge (\mathcal{W} \cap \mathcal{P}_t) \neq 0\}, \quad [4]$$

where $\mathcal{N}$ is the set of NACKs within a current window $\mathcal{W}$, $\mathcal{F}$ and FB-$\mathcal{F}$ are the sets of slots in which FEC and FB-FEC are sent in the current window $\mathcal{W}$, respectively, and $\mathcal{P}_t$ denotes the set of packets in the coded packet sent in slot t. According to equation (4), $m_d$ is the number of NACKed slots in which the coded packets contain new information packets in the current window. Note that these coded packets do not correspond to the FEC or FB-FEC packets.

Still referring to FIG. 3, once the channel behavior has been determined, the sender may add degrees of freedom, DoF, according to the channel rate (304). In embodiments, the sender can add DoF according to the average channel rate. For instance, in an embodiment, the sender can add DoFs, $a_d$, by FEC and FB-FEC in the current window $\mathcal{W}$. Hence, the number of added DoFs can be expressed as follows:

$$a_d = \#\{t: (t \in \mathcal{F} \vee t \in FB\text{-}\mathcal{F}) \wedge (\mathcal{W} \cap \mathcal{P}_t) \neq 0\}. \quad [5]$$

Here, $a_d$ is the number of slots in which FEC or FB-FEC is transmitted in the current window.

In more detail, the AC-RLNC includes an a priori FEC mechanism and posteriori FEC mechanism to add DoFs according to the actual rate of the channel. The two FEC mechanisms provide to the sender sufficient number of DoF to allow for decoding of the coded packets, reducing (and ideally minimizing) the in-order delivery delay. In addition, the two FEC mechanisms also provide for reducing (and ideally minimizing) the redundant packets sent by the sender to increase (and ideally maximize) the throughput.

According to the a priori FEC mechanism, denoted as FEC, the sender sends an adaptive amount of DoFs (i.e., retransmissions) in advance according to the average channel rate. Upon the reception of the feedback, if the sender is at the end of the window (i.e., EW), the sender can repeat the same random linear network coding (RLNC) combinations m times, where m denotes the number of FECs to add per window. In embodiments, the sender can may determine the number of FECs m adaptively according to the average erasure rate e/t computed using the information given over the feedback channel. However, the sender may adjust the number m (i.e., the value of m) to manage the delay-throughput tradeoff. For instance, increasing m may reduce the delay. If the sender transmits redundant DoFs (e.g., due to the variation in the estimation during the round trip delay) that are not required by the receiver, the throughput will reduce.

According to the posteriori FEC mechanism, denoted as feedback-FEC (FB-FEC), the sender adaptively and causally decides whether to send a retransmission or a coded packet that contains new information. Using the FB-FEC mechanism, the sender ensures that the receiver obtains sufficient DoFs to decode the coded packets. The FB-FEC mechanism allows the sender to increase (and ideally maximize) the throughput. Note, however, that increase in the throughput is at the expense of increased in-order delay than the duration of the effective window.

In embodiments, the sender may decide whether to send a retransmission (i.e., insertion of the DoFs) based on a retransmission criterion that depends on whether the feedback is an ACK or a NACK. For example, if the channel rate r is sufficiently higher than the required DoF rate d (which is given by the ratio of the number of DoFs needed to decode $c_t$ and the number of DoFs added to $c_t$), the sender may conclude that the retransmission criterion, r–d>th, is satisfied, where th is the throughput-delay tradeoff parameter or threshold. In this case, the sender can add a new packet $p_i$ to the random linear combination if it is not the EW. Otherwise, if it is the EW, the sender can transmit the same random linear combination.

Note that by setting th=0, the retransmission criterion becomes r>d. In this case, the AC-RLNC tracks the average rate of the channel. However, the sender can set the threshold th adaptively according to the maximum in-order delivery delay requirements of the applications, and the standard deviation of the erasure events. For example, in an embodiment, in order to support the burst of erasures and lower the maximum in-order delivery delay, the sender may determine the second moment of the erasures, $v_e$, such that the threshold is set to be th=$\sqrt{v_e}$. In general, the sender can choose the threshold adaptively, for example, such that th≤$\sqrt{v_e}$, to manage the throughput-delay tradeoffs. Moreover, the sender can use the burst pattern to adapt the transmission criteria.

Still referring to FIG. 3, the sender may generate a coded packet (306). In embodiments, AC-RLNC may be used to code the packets. For example, the sender can adaptively decide whether to add a new information packet to the next coded packet it sends based on the rate of the channel r and the DoF rate $d=m_d/a_d$. The information packets are made available to the transport layer (such as, for example, a TCP/IP transport layer or an OSI transport layer (Layer 4)) and are not declared by the sender as being decoded at the receiver according to the acknowledgements received over the feedback channel in the previous time slot t–1. In embodiments, a coded packet is a causal random linear combination of a subset of information packets within the effective window. The RLNC coded packet $c_t$, transmitted at time slot t, may be given as a function of information packets as follows:

$$c_t = \sum_{i=w_{min}}^{w_{min}+w-1} \mu_i \cdot p_i, \quad [6]$$

where $\mu_i \in \mathbb{F}_z$ are the random coefficients, and $$\{p_i\}_{i=w_{min}}^{w_{min}+w-1}$$

is the subset of information packets within the effective window. Hence, the DoF contained in $c_t$ (i.e., the number of distinct information packets in $c_t$) can be denoted as $\text{DoF}(c_t)$.

Note that one technical advantage of RLNC is that the sender does not need to transmit the same packet, and the receiver only has to collect enough DoFs to be able to decide the packets within the generation window. As noted above, the number of information packets contained in an RLNC coded packet may be determined in accordance with the DoF needed by the receiver.

In embodiments, the sender may determine a sliding window structure (i.e., effective window) by the RTT and the maximum number of information packets that are allowed to overlap, $\bar{o}$. The end of window, EW, may be denoted as RTT−1. The sender can then transmit k=RTT−1 new information packets (using coded packets $c_t$) before the sender repeats the same RLNC combination m=$\lfloor p_e \cdot k \rfloor$ times, where $p_e$ is the erasure probability. Here, the same RLNC combination refers to a RLNC combination where the information packets are the same but with new random coefficients. This is because $p_e \cdot k$ coded packets are expected to be erased on average per k transmitted packets over the channel. Thus, by using FEC of m coded packets in advance, the mean in-order delay is reduced.

In embodiments, the sender may bound the number of information packets in the RLNC to limit the number of missing DoFs (308). To this end, the sender can bound the maximum in-order delivery delay of AC-RLNC by limiting the maximum value of $\overline{\text{EoW}}$, which is the end overlap window of maximum new packets, and transmitting the same RLNC combinations at $\overline{\text{EoW}}$. Stated simply, the sender can bound the number of distinct information packets in $c_t$ by $\bar{o}$, which is the maximum number of information packets allowed to overlap. Limiting the maximum number of information packets that can overlap, $\overline{\text{EoW}}$, reduces the mean and limits the maximum in-order delivery delay. Note however that the window structure may affect the in-order delivery delay.

The effective window size for the coded combination $c_t$ at time slot t may be denoted as $\mathcal{W} \in \{1, \ldots, \bar{o}\}$, and the actual index of the first information packet in $c_t$ (i.e., $\mathcal{W}_{min}−1$ is the index of the last information packet declared as decoded at the sender) as $\mathcal{W}_{min}$. The sender can then adaptively determine the value of $\mathcal{W}$, the effective window size, based on the retransmission criterion r−d>th.

In embodiments, the sender may upper bound the mean in-order delivery delay. As noted above, the rate of DoF is given by the expression $d=m_d/a_d$. Thus, the number of DoFs needed by the receiver to decode $c_t$ (i.e., $m_d$) satisfies $m_d=\bar{o}\epsilon$, and the DoF added (i.e., $a_d$) satisfies $$a_d = \frac{1}{1-\epsilon}m_d + \epsilon m_e = \frac{1}{1-\epsilon}\bar{o}\epsilon + \epsilon\bar{o}\epsilon, \quad [7]$$

where $m_e=\bar{o}\epsilon$ is the effective number of DoFs required by the receiver, and k=RTT−1 is the number of new information packets (using coded packets $c_t$) the sender can transmit before the sender repeats the same RLNC combination.

The condition for retransmission is r>d+th, such that $$1−r=\epsilon<1−d−th. \quad [8]$$

Hence, $\epsilon<\epsilon_{max}\leq1−d−th$, where $\epsilon_{max}$ is an upper bound to the erasure probability of the forward channel calculated from the available acknowledgements at the sender with respect to the transmission criterion.

However, in order to determine the mean in-order delivery delay, $D_{mean}$, and the maximum in-order delivery delay, $D_{max}$, the probability that it is $\overline{\text{EoW}}$, $\mathbb{P}_{\overline{E o W}}$, and the probability that r>d+th over two windows, $\mathbb{P}_{r>d+th}$, need to be determined. The probability that it is $\overline{\text{EoW}}$, which is the condition for starting a new generation, can be computed as:

$$\mathbb{P}_{\overline{E o W}}=(1−\epsilon_{max})^{\bar{o}}. \quad [9]$$

The probability that r>d+th over two windows $\mathbb{P}_{r>d+th}$, which is the condition for retransmission, can be computed as:

$$\mathbb{P}_{r>d+th} = \sum_{i=1}^{\lfloor \bar{o}\epsilon_{max} \rfloor} \binom{\bar{o}}{i}\epsilon^i 1-\epsilon^{\bar{o}-i}. \quad [10]$$

Having determined $\mathbb{P}_{\overline{E o W}}$ and $\mathbb{P}_{r>d+th}$, upper bounds for the mean in-order delay for the forward channel (e.g., BEC) can be derived under the different feedback states no feedback, NACK feedback, and ACK feedback.

In the case of no feedback, the mean in-order delivery delay, $D_{mean[no\ feedback]}$, is as follows:

$$D_{mean[no\ feedback]} \leq \frac{1}{1-\epsilon_{max}}[\mathbb{P}_{\overline{E o W}}(m_e + k) + (1 - \mathbb{P}_{\overline{E o W}})RTT], \quad [11]$$

in which, if it is $\overline{\text{EoW}}$ (i.e., relation [9] is satisfied), the same RLNC is transmitted $m_e$ times, yielding a delay of $m_e$+k. If it is not $\overline{\text{EoW}}$, a new $p_i$ is added to the RLNC and transmitted, yielding a delay of RTT=k+1. Note that the scaling term in the upper bound $$\frac{1}{1-\epsilon_{max}}$$

is due to the maximum number of retransmissions needed to succeed in the forward channel.

In the case of a NACK feedback, the mean in-order delivery delay, $D_{mean[nack\ feedback]}$, is as follows:

$$D_{mean[nack\ feedback]} \leq \quad [12]$$

$$\epsilon_{max}\frac{1}{1-\epsilon_{max}}[\mathbb{P}_{r>d+th}[(1 - \mathbb{P}_{\overline{E o W}})RTT + \mathbb{P}_{\overline{E o W}}(m_e + k)] +$$

$$(1 - \mathbb{P}_{r>d+th})[RTT + \mathbb{P}_{\overline{E o W}}(m_e + k)]],$$

which follows from that, given r>d+th, which is with probability $\mathbb{P}_{r>d+th}$, the mean in-order delay is the same as the case when there is no feedback. If r≤d+th, which occurs with probability $(1-\mathbb{P}_{r>d+th})$, the same RLNC is transmitted. If it is EoW, the same combination is retransmitted $m_e$ times. Here, the scaling term $$\frac{1}{1-\epsilon_{max}},$$

similar to the no feedback case, is due to the maximum number of retransmissions needed to succeed in the forward channel.

In the case of a ACK feedback, the mean in-order delivery delay, $D_{mean[ack\ feedback]}$, is as follows:

$$D_{mean[ack\ feedback]} \leq \qquad [13]$$
$$(1-\epsilon_{max})[\mathbb{P}_{\overline{EoW}}(m_e+k)+(\mathbb{P}_{r>d+th})RTT+(1-\mathbb{P}_{r>d+th})RTT],$$

which is due to, that when it is the EoM, the same RLNC is transmitted $m_e$ times. Then, if r≤d+th, which occurs with probability $\mathbb{P}_{r>d+th}$, a new packet is added to the RLNC and transmitted, yielding a delay of RTT=k+1. Otherwise, the same RLNC is transmitted, yielding a delay of RTT=k+1. Since the feedback is an ACK, the mean in-order delivery delay that is computed is scaled by $1-\epsilon_{max}$, which is a lower bound on the probability of getting an ACK with perfect feedback.

Given the round trip delay, there is no feedback in the first transmission window. Hence, to normalize the effect of not having feedback, the AC-RLNC can use a normalization parameter $\lambda$ denoting the fraction of the time there is feedback, such that the $D_{mean}$ is bounded by $$D_{mean} \leq \lambda D_{mean[no\ feedback]} + (1-\lambda)(D_{mean[nack\ feedback]} + D_{mean[ack\ feedback]}). \qquad [14]$$

In the case where a forward channel models a GE channel, erasure events only occur when the forward channel is in state B. Therefore, the average number of transmissions in the forward channel can be computed using the following relation:

$$\pi_G + \sum_{k=2}^{\infty} \pi_B (1-s)^{k-2} sk, \qquad [15]$$

where the first term denotes the fraction of time the channel is state G, for which only one transmission is required (i.e., k=1), and the term inside the summation denotes the probability that the channel starts in state B and transits to state G in k≥2 time slots. Evaluating relation [9], along with $\pi_B=1-\pi_G=\epsilon$, the number of retransmissions needed to succeed in the forward channel is given by:

$$1 + \epsilon\left[\left(\frac{1}{1-s}\right)\left(\frac{1}{s}-s\right)-1\right], s \in (0,1]. \qquad [16]$$

If $$\frac{1}{s}-s-1 > \frac{1}{1-\epsilon},$$

the number of retransmissions needed for GE channel is higher than the number of retransmissions for BEC. In the case of a bursty GE channel model (i.e., when s is small such that $$\left(\frac{1}{1-s}\right)\left(\frac{1}{s}-s\right)-1 > \frac{1}{1-\epsilon}),$$

the number of retransmissions needed in this case is higher compared to the BEC case. Based on this consideration and using similar upper bounding techniques as in the case of BEC (e.g., [11], [12], and [13]), the upper bound for the mean in-order delay for the GE channel is higher than for a BEC channel.

In embodiments, the sender may upper bound the maximum in-order delivery delay. For example, in an implementation of AC-RLNC, the maximum number of information packets in $c_t$ is limited. Thus, when $DoF(c_t)=\overline{o}$, the sender transmits the same RLNC combination until all a information packets are decoded. In this case, since each transmitted packet is a coded combination, any $\overline{o}$ packets delivered at the receiver are sufficient to decode $c_t$. The time interval between when the first information packet in $c_t$ is first transmitted and when all the $\overline{o}$ information packets in $c_t$ are decoded at the receiver may be denoted as $\mathcal{W}_{max}$. This time interval $\mathcal{W}_{max}$ may also include at most $a_{d_{max}}$ coded packets that are erased in the forward channel, in addition to $\overline{o}$ coded packets successfully delivered to the receiver. Hence, $\mathcal{W}_{max}=\overline{o}+a_{d_{max}}$. Note that the maximum delay that the first information packet can experience is when there are $a_{d_{max}}$ erasures first, and then the $\overline{o}$ are successfully delivered next (i.e., when the channel is bursty).

The probability of error which is when there are more than $a_{d_{max}}$ packets that are erased in $\mathcal{W}_{max}$ may be denoted as $P_e$. Hence, $$\mathbb{P}_e \leq \epsilon^{a_{dmax}} = \epsilon^{w_{max}-\overline{o}}.$$

Rearranging the terms results in $\mathcal{W}_{max} \geq \log_{\epsilon_{max}}(\mathbb{P}_e)+\overline{o}$. Since the maximum number of missing DoFs in $\mathcal{W}_{max}$ is $\overline{o}\epsilon_{max}$, the maximum in-order delay is bounded by $D_{max} \leq \overline{o}\epsilon_{max}+\log_{\epsilon_{max}}(\mathbb{P}_e)+\overline{o}$ for any selected error probability $\mathbb{P}_e$.

In embodiments, the sender may upper bound the throughput. For example, in an implementation of AC-RLNC, the sender can learn the rate of the channel and the rate of the DoF according to the acknowledgements obtained over the feedback channel. However, note that due to the RTT delay, the rates at the sender are updated with delay. Hence, at time slot t, the actual retransmission criterion at the sender may be calculated as $r(t^-)-d(t^-)>th(t^-)$, where $t^-=t-RTT$. Hypothetically, if RTT is less than 1 slot (i.e., RTT<1), AC-RLNC is able to obtain the rate of the channel. However, in the non-asymptotic model being considered, RTT delay is higher (e.g., RTT≥2). Hence, there may be degradation on the throughput due to the variations in the channel. This is because those variations are not reflected in the retransmission criterion at the sender in time slot t. By bounding the channel variance during RTT, the sender can provide bounds on the throughput. By bounding the variance, the sender can obtain the maximum variation between the channel rate calculated at the sender for the retransmission criterion (i.e., $r(t^-)-d(t^-)>th(t^-)$) to the actual channel rate.

In AC-RLNC, the calculated rate may set the number of RLNC coded packets with the same or new information packets to be transmitted during the period of RTT. $c=(c_{\tilde{t}}, \ldots, c_t)$ denotes the vector of the RLNC packets transmitted during a period of RTT transmissions given the estimated rate $r(t^-)$. $c'=(c'_{\tilde{t}}, \ldots, c'_t)$ denotes the vector of the RLNC packets transmitted if the actual rate of the channel $r(t)$ was available at the sender non-causally.

In the case where the actual rate of the channel $r(t)$ at time slot t is higher than the rate, $r(t^-)$, estimated at the sender at time slot $t^-$, the sender can transmit additional DoF (additional RLNC coded packets of the same information packets with different coefficients) which are not required at the receiver to decode. In the case where the estimated rate is lower than the actual rate of the channel, there is no loss (reduction) in throughput because the sender does not transmit redundant DoFs. However, since there are missing DoFs at the receiver to decode, the in-order delivery delay increases. The number of the additional DoF not required by the receiver, during RTT time slots, can be determined according to the distance between the number of packets not erased at the receiver given $r(t)$, to the estimated number of non-erased packets given $r(t^-)$.

In an embodiment, the upper bound to the throughput may be provided using the Bhattacharyya distance. The Bhattacharyya distance is given by $l(c, c')=-\ln(BC(c, c'))$, where $BC(c, c')$ is the Bhattacharyya coefficient, which is given as $BC(c, c')=\Sigma_y \sqrt{W(y|c)W(y|c')}$, and $W(y|c)$ and $W(y|c')$ are the channel transition probabilities from inputs c and c' to output vector y, respectively. Note that bounds on the Bhattacharyya distance for codes can be immediately mapped to bounds on the reliability function for certain channels.

Still referring to FIG. 3, having generated the coded packet, the sender may transmit the coded packet to the receiver (310).

Figure 4A:
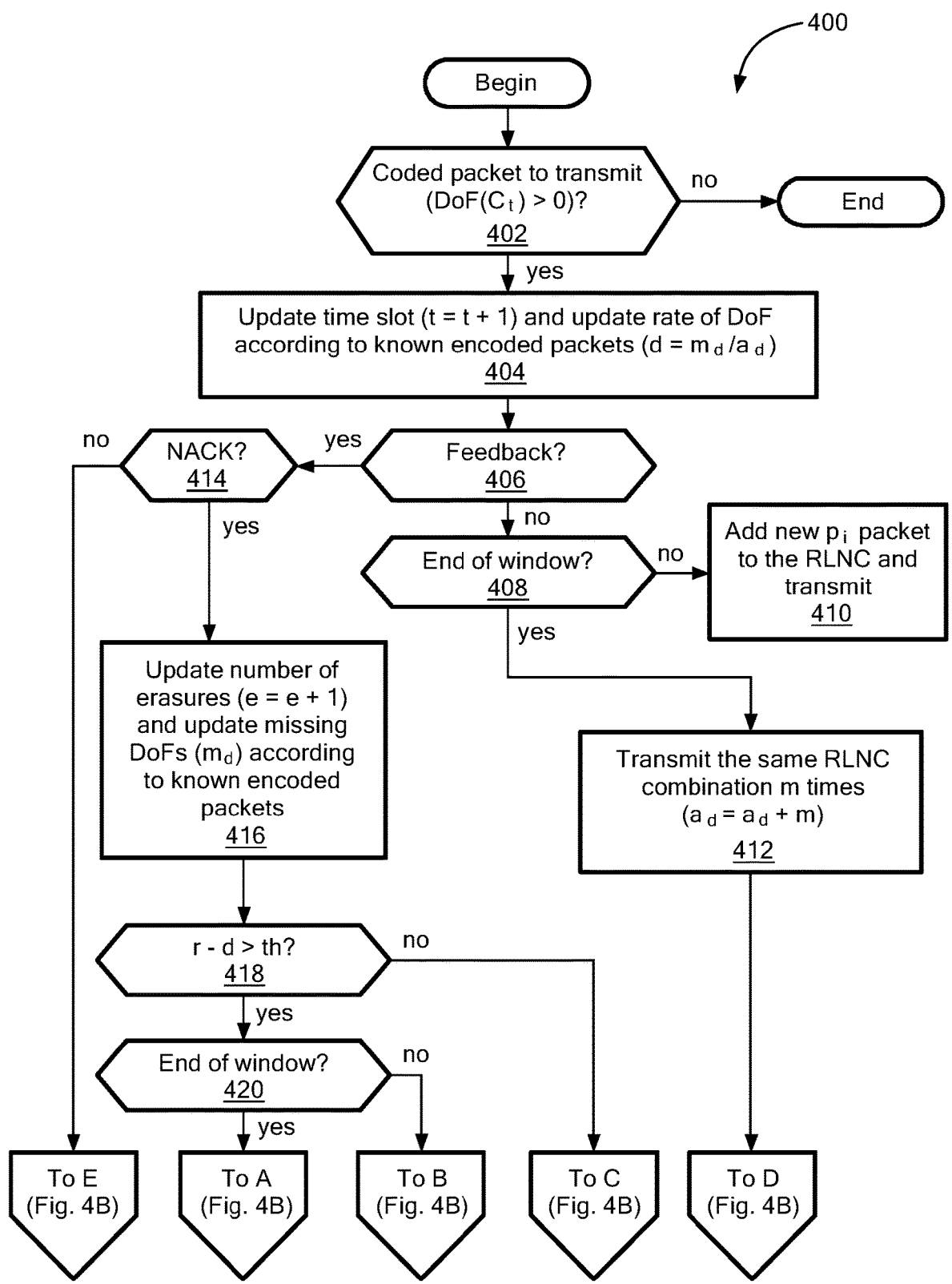
FIGS. 4A and 4B are a flow diagram of an example adaptive and causal random linear network coding (AC-RLNC) process for packet scheduling, in accordance with an embodiment of the present disclosure.
Figure 4B:
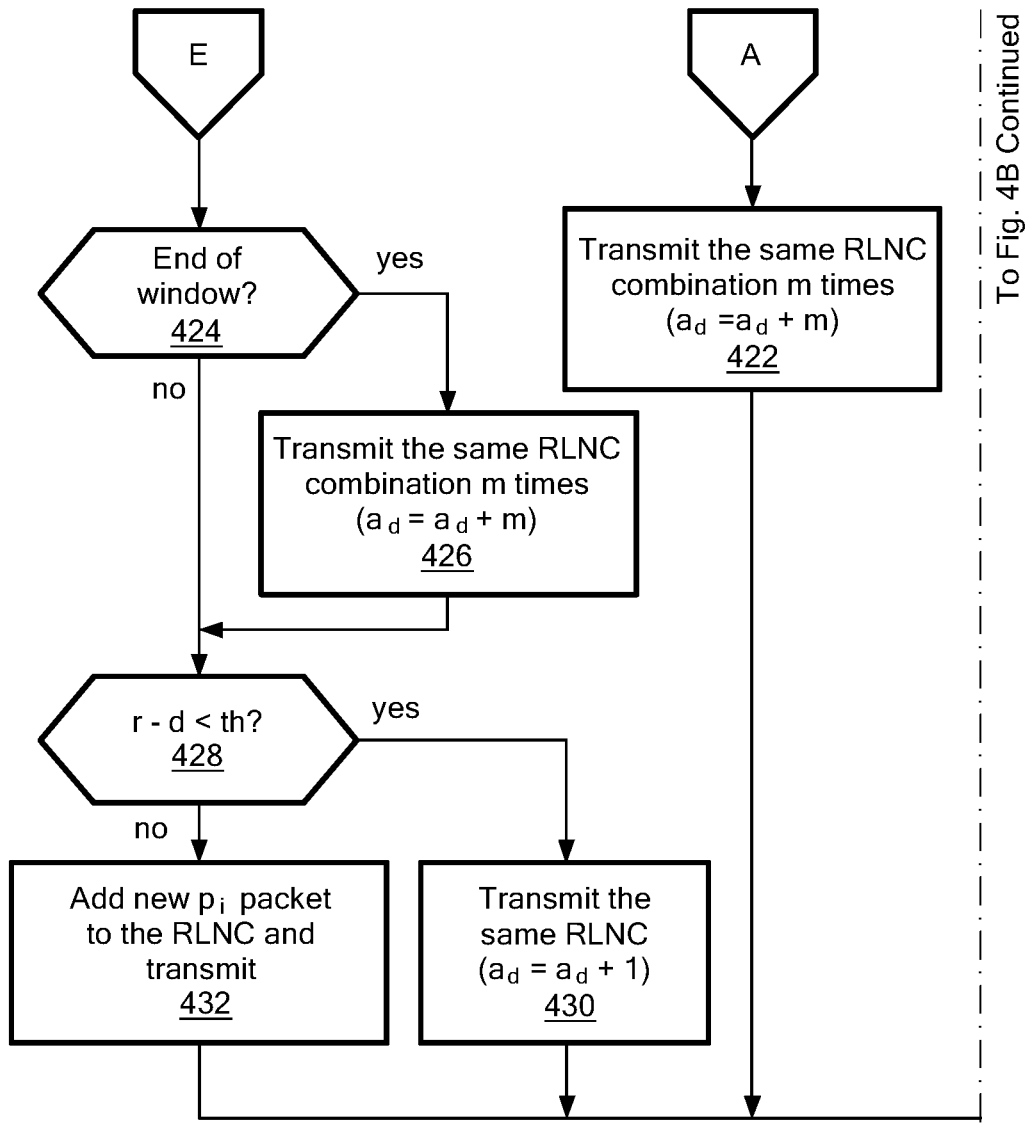
Figure 4B:
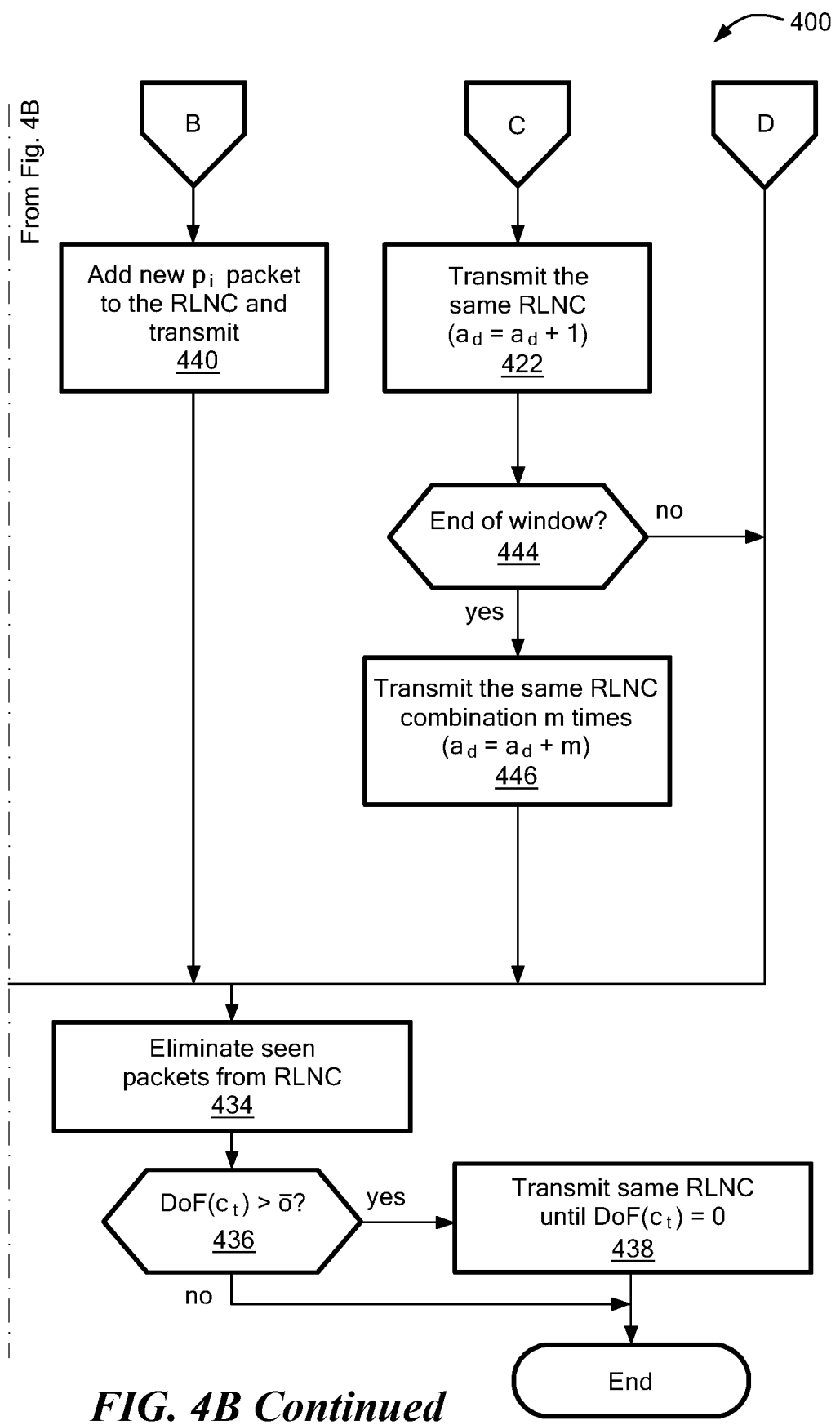

FIGS. 4A and 4B show a flow diagram of an example adaptive and causal random linear network coding (AC-RLNC) process 400 for packet scheduling, in accordance with an embodiment of the present disclosure. For example, process 400, and example process 700 further described below, may be implemented within the system described above in conjunction with FIG. 1.

With reference to FIG. 4A, process 400 is initiated and, at 402, the sender checks to determine whether there is a coded packet to transmit ($DoF(c_t)>0$) to the receiver. If there are no more coded packets to transmit, the sender may end process 400.

Otherwise, if there is a coded packet to transmit, then, at 404, the sender updates the time slot (t=t+1) and updates the rate of DoF according to the known encoded packets ($d=m_d/a_d$). At 406, the sender checks to determine whether there is feedback from the receiver. If no feedback has been received from the receiver, then, at 408, the sender checks to determine whether the effective window ends with k new information packets. If the effective window does not end with k new information packets, then, at 410, the sender adds a new information packet $p_i$ to the RLNC, generates a new coded packet $c_t$ that includes the RLNC, and transmits the coded packet.

Otherwise, if the effective window does end with k new information packets, then, at 412, the sender transmits the same RLNC combination m times. The sender then updates the DoF added to $c_t$ ($a_d=a_d+m$). Then, at 434, the sender eliminates the seen packets from the RLNC. At 436, the sender checks to determine whether the coded packet $c_t$ exceeds a maximum number of information packets allowed to overlap ($DoF(c_t)>\bar{o}$). If the coded packet $c_t$ exceeds the maximum number of information packets allowed to overlap, then, at 438, the sender transmits the same RLNC until the DoF contained in $c_t$ is zero ($DoF(c_t)=0$). The sender may then end process 400. Otherwise, if the coded packet $c_t$ does not exceed the maximum number of information packets allowed to overlap, the sender may end process 400.

Otherwise, if at 406 it is determined that feedback has been received from the receiver, then, at 414, the sender checks to determine whether the feedback received is a NACK. If the feedback is a NACK, then, at 416, the sender updates the number of erasures (e=e+1). The sender also updates the missing DoFs ($m_d$) according to the known encoded packets. At 418, the sender checks to determine whether the retransmission criterion is satisfied (r−d>th).

If the retransmission criterion is satisfied, then, at 420, the sender checks to determine whether the effective window ends with k new information packets. If the effective window does not end with k new information packets, then, at 440, the sender adds a new information packet $p_i$ to the RLNC, generates a new coded packet $c_t$ that includes the RLNC, and transmits the coded packet. Then, at 434, the sender eliminates the seen packets from the RLNC. At 436, the sender checks to determine whether the coded packet $c_t$ exceeds a maximum number of information packets allowed to overlap ($DoF(c_t)>\bar{o}$). If the coded packet $c_t$ exceeds the maximum number of information packets allowed to overlap, then, at 438, the sender transmits the same RLNC until the DoF contained in $c_t$ is zero ($DoF(c_t)=0$). The sender may then end process 400. Otherwise, if the coded packet $c_t$ does not exceed the maximum number of information packets allowed to overlap, the sender may end process 400.

Otherwise, if at 420 it is determined that effective window does end with k new information packets, then, at 422, the sender transmits the same RLNC combination m times. The sender then updates the DoF added to $c_t$ ($a_d=a_d+m$). Then, at 434, the sender eliminates the seen packets from the RLNC. At 436, the sender checks to determine whether the coded packet $c_t$ exceeds a maximum number of information packets allowed to overlap ($DoF(c_t)>\bar{o}$). If the coded packet $c_t$ exceeds the maximum number of information packets allowed to overlap, then, at 438, the sender transmits the same RLNC until the DoF contained in $c_t$ is zero (DoF ($c_t$)=0). The sender may then end process 400. Otherwise, if the coded packet $c_t$ does not exceed the maximum number of information packets allowed to overlap, the sender may end process 400.

Otherwise, if at 418 it is determined that the retransmission criterion is not satisfied, then, at 442, the sender transmits the same RLNC. The sender then updates the DoF added to $c_t$ ($a_d=a_d+1$). At 444, the sender checks to determine whether the effective window ends with k new information packets. If the effective window does not end with k new information packets, then, at 434, the sender eliminates the seen packets from the RLNC. At 436, the sender checks to determine whether the coded packet $c_t$ exceeds a maximum number of information packets allowed to overlap ($DoF(c_t)>\bar{o}$). If the coded packet $c_t$ exceeds the maximum number of information packets allowed to overlap, then, at 438, the sender transmits the same RLNC until the DoF contained in $c_t$ is zero ($DoF(c_t)=0$). The sender may then end process 400. Otherwise, if the coded packet $c_t$ does not exceed the maximum number of information packets allowed to overlap, the sender may end process 400.

Otherwise, if at 444 it is determined that the effective window does end with k new information packets, then, at 446, the sender transmits the same RLNC combination m times. The sender then updates the DoF added to $c_t$ ($a_d=a_d+$ m). Then, at 434, the sender eliminates the seen packets from the RLNC. At 436, the sender checks to determine whether the coded packet $c_t$ exceeds a maximum number of information packets allowed to overlap (DoF($c_t$)>$\bar{o}$). If the coded packet $c_t$ exceeds the maximum number of information packets allowed to overlap, then, at 438, the sender transmits the same RLNC until the DoF contained in $c_t$ is zero (DoF($c_t$)=0). The sender may then end process 400. Otherwise, if the coded packet $c_t$ does not exceed the maximum number of information packets allowed to overlap, the sender may end process 400.

Otherwise, if at 414 it is determined that the feedback received is not a NACK (i.e., the feedback is an ACK), then, at 424, the sender checks to determine whether the effective window ends with k new information packets. If the effective window does end with k new information packets, then, at 426, the sender transmits the same RLNC combination m times. The sender then updates the DoF added to $c_t$ ($a_d = a_d + m$).

If the effective window does not end with k new information packets or subsequent to transmitting same RLNC combination m times (i.e., block 426), at 428, the sender checks to determine whether the difference between the rate of the channel (r) and the rate of DoF (d) is less than the throughput-delay tradeoff (th) (i.e., check to determine whether r−d<th). If r−d<th, then, at 430, the sender transmits the same RLNC. The sender then updates the DoF added to $c_t$ ($a_d = a_d + 1$). Otherwise, at 432, the sender adds a new information packet $p_i$ to the RLNC, generates a new coded packet $c_t$ that includes the RLNC, and transmits the coded packet.

Then, after performing block 430 or block 432, at block 434, the sender eliminates the number of seen packets (i.e. received packets) from the RLNC. Here, the sender is estimating the number of seen packets. At 436, the sender checks to determine whether the coded packet $c_t$ exceeds a maximum number of information packets allowed to overlap (DoF($c_t$)>$\bar{o}$). If the coded packet $c_t$ exceeds the maximum number of information packets allowed to overlap, then, at 438, the sender transmits the same RLNC until the DoF contained in $c_t$ is zero (DoF($c_t$)=0). The sender may then end process 400. Otherwise, if the coded packet $c_t$ does not exceed the maximum number of information packets allowed to overlap, the sender may end process 400.

Figure 5:
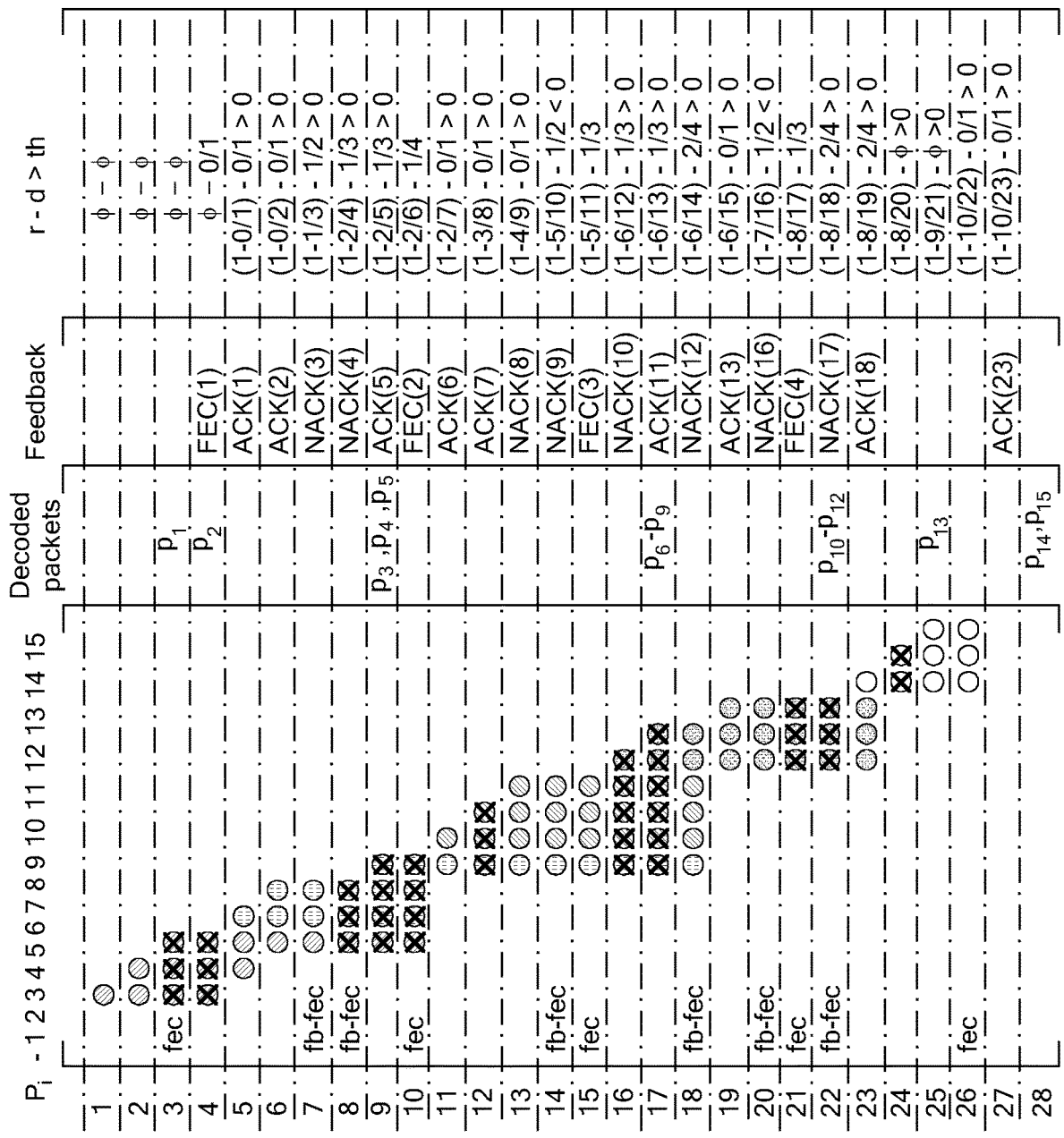
FIG. 5 is a diagram of an illustrative coding matrix for an example communication, in accordance with an embodiment of the present disclosure.

FIG. 5 is a diagram of an illustrative coding matrix for an example communication using causal random linear network coding (AC-RLNC). In particular, the example is of a point-to-point communication between a sender and a receiver, wherein, in each time slot t, the sender may transmit a coded packet $c_t$ to the receiver over a forward channel. The receiver, over a feedback channel, sends feedback to the sender on each coded packet transmitted. For clarity, the feedback channel is assumed to be noiseless. As described previously, for a noiseless feedback channel, the receiver reliably transmits ACK(t) or NACK(t) after RTT for each t-th coded packet transmitted by the sender. The illustrative example assumes a RTT of four (4) time slots and a maximum number of information packets allowed to overlap of 2 k (i.e., $\bar{o}$=2 k).

As shown in FIG. 5, each row of the coding matrix represents a time step (or time slot) t, the dots in each row indicate the composition of the coded packet that was sent at each particular time slot. Each column of the coding matrix represents a packet (e.g., information packet) p, and the dots indicate whether there is a contribution by a particular packet into the linear combination (contribution into the coded packet sent in a time slot). For example, as shown by the two dots in row 2, the coded packet sent by the sender at time slot t=2 is a coded packet that is a linear combination of information packets $p_1$ and $p_2$. The columns labeled "Feedback" and "r−d>th" include information maintained by the sender during the sending of the coded packets to the receiver. The column labeled "Decoded packets" include information maintained by the receiver. In one example embodiment, a coded packet may include a payload portion that includes the linear combination, such as the RLNC code, and a header portion that includes a coefficient vector that represents the coefficients used in the linear combination. Note that it is not necessary to send the coefficients used in the linear combination. Indeed, in other embodiments, a coded packet may not include the coefficients, in which case the receiver may decode by gaussian elimination or other suitable method.

In more detail with respect to the example of FIG. 5, in order to manage the delay-throughput tradeoff, the sender first transmits an a priori FEC every RTT period according to the actual rate of the channel. Then, posteriori, the sender adaptively and causally decides if to add new information packet to the RLNC or to send additional DoF according to the rate of the channel. In the column labeled "r−d>th", d is updated after the sender computes r−d in a way that $m_d = m_d + 1$, $a_d = a_d$. Therefore, the equation r−d>0 becomes correct after the update.

In the example communication, at time slot t=1, the sender determines that there is an information packet $p_1$ to send to the receiver. Note that the size of the effective window is k=3, which is based on the assumption of RTT=4 (recall that RTT is computed as k+1). Since no feedback has been received from the receiver, and it is not the end of the effective window (denoted as EW) (e.g., the effective window does not end with k new information packets), the sender includes packet $p_1$ into the effective window and generates a coded packet $c_1$ that includes a linear combination of the information packets included in the effective window (e.g., $p_1$), and transmits $c_1$ to the receiver. The sender can then update the rate of DoF (denoted as $d = m_d/a_d$), which is the ratio of the missing DoF to decode $c_1$ (denoted as $m_d$) to the DoF added to $c_1$ (denoted as $a_d$). The sender may check to determine whether coded packet $c_1$ satisfies DoF($c_t$)≤2 k, and concludes that $c_1$ does not exceed the allowable DoF. In some embodiments, the maximum number of DoF allowed to be included in a coded packet $c_1$ is a tunable parameter. For example, streaming applications, such as real-time video or audio applications, to name a few examples, that are sensitive to in-order-delay may benefit from reducing the maximum inter-arrival time between any two packets with new information. In contrast, applications that are not as sensitive to in-order-delay, such as file transfer applications, may benefits from shortening the overall completion time.

Continuing the example, at time slot t=2, the sender determines that there is an information packet $p_2$ to send to the receiver. Since no feedback has been received from the receiver, and the effective window does not end with k new information packets (note that at this point, the effective window ends with new information packet $p_1$), the sender includes packet $p_2$ into the effective window and generates and transmits a coded packet $c_2$ that includes a linear combination of the packets in the effective window (i.e., $p_1$ and $p_2$). The sender can then update the rate of DoF. The sender can also check whether DoF($c_2$)>2 k.

Continuing the example, at time slot t=3, the sender determines that there is an information packet $p_3$ to send to the receiver. Since no feedback has been received from the receiver, and the effective window does not end with k new information packets (note that at this point, the effective window ends with new information packets $p_1$ and $p_2$), the sender includes packet $p_3$ into the effective window and generates and transmits a coded packet $c_3$ that includes a linear combination of the information packets included in the effective window (i.e., $p_1$, $p_2$, and $p_3$). The sender can then update the rate of DoF. The sender can also check whether $DoF(c_3) > 2$ k.

Continuing the example, at time slot t=4, the sender determines that there is an information packet $p_4$ to send to the receiver. However, notwithstanding that no feedback has been received from the receiver, the sender checks and determines that the effective window ends with k new information packets (i.e., $p_1$, $p_2$, and $p_3$). As a result, the sender generates and transmits a forward error correction (FEC) packet to the receiver. For example, the FEC packet at t=4 can be a new linear combination of $p_1$, $p_2$, and $p_3$. It is also possible that the sender may transmit the same FEC multiple times. The number of FECs, m, can be specified based on the average erasure probability, which can be computed based on information provided over the feedback channel. In other words, m is a tunable parameter. In the present example of FIG. 5, m=1, which results in low throughput when the channel rate is high, and low in-order delay when the channel rate is low. Hence, m can be adaptively adjusted to exploit the value of the average erasure rate in the channel to achieve a desired delay-throughput tradeoff.

At t=4, transmission of the FEC packet is noted by the designation "fec" in row t=4. The sender can then update the DoF added to $c_f$, and the rate of DoF. Note that the transmission of this FEC is initiated by the sender (e.g., the transmission of the FEC packet was not a result of feedback from the receiver). Further note that packet $p_4$ is not included in the effective window. The sender may check that $c_4$ does not exceed the allowable DoF (e.g., $DoF(c_4) > 2$ k).

Continuing the example, at time slot t=5, the sender determines that it still needs to transmit information packet $p_4$. The sender may also determine that it received from the receiver an acknowledgement of the receipt of coded packet $c_1$ (e.g., denoted by the designation "ACK(1)" in the Feedback column at row t=5). Hence, the sender can remove a DoF (e.g., packet $p_1$) from the effective window. The result in this instance is that the effective window slides to the right, thus effectively becoming a sliding window. In this case, the sender determines that the effective window does not end with k new information packets, and checks to determine whether the channel rate r is higher than the DoF rate d, i.e., the threshold condition for retransmission (e.g., transmission of an FEC) is th=0. Hence, the sender can conclude that the channel rate r is sufficiently higher than the DoF rate d (e.g., denoted by "(1−0/1)−0/1>0" in the right-most column at row t=5). Note that r=1−e/t, where e is the number of erasure packets and t is the number of transmitted packets for which the sender has received acknowledgements. Having determined that r−d≥0, the sender includes packet $p_4$ into the effective window and generates a coded packet $c_5$ that includes a linear combination of the information packets included in the effective window (i.e., $p_2$, $p_3$, and $p_4$), and transmits $c_5$ to the receiver. The sender can then update the rate of DoF. The sender can also check that $c_5$ does not exceed the allowable DoF (e.g., $DoF(c_5) > 2$ k).

Continuing the example, at time slot t=6, the sender determines that there is an information packet $p_5$ to send to the receiver. The sender may also determine that it received from the receiver an acknowledgement of the receipt of coded packet $c_2$ (e.g., denoted by the designation "ACK(2)" in the Feedback column at row t=6). Hence, the sender can remove a DoF (e.g., packet $p_2$) from the effective window. In this case, the sender determines that the effective window does not end with k new information packets (note that at this point, the effective window ends with new information packet $p_4$). The sender can check to determine whether r−d≥0. Having determined that (1−0/2)−0/1>0 (in the right-most column at row t=6), the sender includes packet $p_5$ into the effective window, and generates and transmits a coded packet $c_6$ that includes a linear combination of the information packets included in the effective window (i.e., $p_3$, $p_4$, and $p_5$). The sender can then update the rate of DoF. The sender can also check that $c_6$ does not exceed the allowable DoF (e.g., $DoF(c_6) > 2$ k).

Continuing the example, at time slot t=7, the sender determines that there is an information packet $p_6$ to send to the receiver. The sender may also determine that it received from the receiver a negative acknowledgement indicating the non-receipt of coded packet $c_3$ (e.g., denoted by the designation "NACK(3)" in the Feedback column at row t=7). As can be seen in FIG. 5, the non-receipt of coded packet $c_3$ is denoted by the x'ed out dots in row t=3. Upon receipt of the NACK, the sender increments a count of the number of erasures (denoted as e). For example, since this is the first erasure (e.g., first erased packet), the count of the number of erasures e is incremented to a value of one (1). The sender then updates the missing DoF to decode $c_7$ according to the number of NACKs received. In this instance, the sender updates the missing DoF to decode $c_7$ to a value of one (1) since this is the first NACK. The sender then checks to determine whether the retransmission condition is satisfied. Since (1−⅓)−1/1<0 (i.e., the retransmission condition is not satisfied), the sender generates and transmits an FEC packet $c_7$ to the receiver. In this instance, the FEC packet $c_7$ is a new linear combination of packets $p_3$, $p_4$, and $p_5$. Note that the threshold condition (1−⅓)−½<0 noted in the right-most column at row t=7 indicates the state of the threshold condition subsequent to transmission of packet $c_7$. The transmission of this FEC is a result of feedback provided by the receiver (e.g., denoted in FIG. 5 by the designation "fb-fec" in row t=7). The sender then updates the DoF added to $c_7$. The sender determines that the effective window does not end with k new information packets (e.g., effective window ends with new information packets $p_4$ and $p_5$), and then updates the rate of DoF. The sender can also check that $c_7$ does not exceed the allowable DoF (e.g., $DoF(c_7) > 2$ k).

Continuing the example, at time slot t=8, the sender determines that it still needs to send information packet $p_3$ to the receiver. The sender may also determine that it received from the receiver a negative acknowledgement indicating the non-receipt of coded packet $c_4$ (e.g., denoted by the designation "NACK(4)" in the Feedback column at row t=8). As can be seen in FIG. 5, the non-receipt of coded packet $c_4$ is designated by the x'ed out dots in row t=4. Upon receipt of the NACK, the sender increments a count of Since non-receipt of a coded packet is indicated by the receiver, the sender increments a count of e, the number of erasures. In this instance, since this is the second erasure, the count of e is incremented by one to a value of two (i.e., e=1+1). The sender then updates the missing DoF to decode $c_7$. After the sender checks that the retransmission threshold is not satisfied, the sender generates and transmits an FEC packet $c_8$ to the receiver. In this instance, the FEC packet $c_8$ is a new linear combination of packets $p_3$, $p_4$, and $p_5$. The transmission of this FEC is a result of feedback provided by the receiver (e.g., denoted in FIG. 5 by the designation "fb-fec" in row t=8). The sender then updates the DoF added to $c_8$, and determines that the effective window does not end with k new information packets (e.g., effective window ends with new information packets $p_4$ and $p_5$). The sender can then update the rate of DoF. The sender can also check that $c_8$ does not exceed the allowable DoF (e.g., DoF($c_8$)>2 k).

Continuing the example, at time slot t=9, the sender determines that it still needs to send information packet $p_3$ to the receiver. The sender may also determine that it received from the receiver an acknowledgement of the receipt of coded packet $c_5$ (e.g., denoted by the designation "ACK(5)" in the Feedback column at row t=9). Since the sender received an acknowledgement, and determines that the effective window does not end with k new information packets (note that at this point, the effective window ends with new information packets $p_3$, $p_4$, and $p_5$), the sender checks to determine whether r−d≥0. Having determined that (1−2/5)−1/3>0 (in the right-most column at row t=9), the sender includes packet $p_6$ into the effective window, and generates and transmits a coded packet $c_9$ that includes a linear combination of the information packets included in the effective window (i.e., $p_3$, $p_4$, $p_5$, and $p_6$). The sender can then update the rate of DoF. The sender can also check that $c_9$ does not exceed the allowable DoF (e.g., DoF($c_9$)>2 k).

Continuing the example, at time slot t=10, the sender determines that it needs to send information packet $p_3$ to the receiver. The sender may also determine that it received from the receiver an acknowledgement of the receipt of coded packet $c_6$ (e.g., denoted by the designation "ACK(6)" in the Feedback column at row t=10). Since the sender received an acknowledgement, the sender can determine that the effective window ends with information packets $p_3$, $p_4$, $p_5$, and $p_6$. In other words, the sender can determine that the effective window ends with k new information packets (note that at this point, the effective window ends with new information packets $p_4$, $p_5$, and $p_6$). As a result, the sender generates and transmits a FEC packet $c_{10}$. The sender can then update the added DoF (i.e., ad=3+1). Now, since (1−2/6)−1/4>0, the sender includes packet $p_7$ into the effective window. The sender then generates a coded packet $c_{11}$ to transmit at time slot t=11 that includes a linear combination of the information packets in the effective window (i.e., $p_3$, $p_4$, $p_5$, $p_6$, and $p_7$). The sender can also check that $c_{11}$ does not exceed the allowable DoF (e.g., DoF($c_{11}$)>2 k).

Continuing the example, at time slot t=11, the sender transmits coded packet $c_{11}$. However, according to the acknowledgement indicating the receipt of coded packet $c_7$ (e.g., denoted by the designation "ACK(7)"), the sender can remove DoF (e.g., information packets $p_3$, $p_4$, and $p_5$) from the effective window. The sender can then update the rate of DoF.

Continuing the example, at time slot t=12, the sender sees an acknowledgement of the receipt of coded packet $c_7$ (e.g., denoted by the designation "ACK(7)" in the Feedback column at row t=12). Since the sender received an acknowledgement, and determines that the effective window does not end with k new information packets (note that at this point, the effective window ends with new information packet $p_7$), the sender checks to determine whether r−d≥0. Having determined that (1−3/8)−0/1>0 (in the right-most column at row t=12), the sender includes packet $p_8$ into the effective window. The sender then generates and transmits a coded packet $c_{12}$. Packet $c_{12}$ includes a linear combination of the information packets included in the effective window (i.e., $p_6$, $p_7$, and $p_8$). The sender can then update the rate of DoF. The sender can also check that $c_{12}$ does not exceed the allowable DoF (e.g., DoF($c_{12}$)>2 k).

The sender can continue the sending of information or coded packets during time slots t=13 to t=27 in a manner similar to the example process described above. For example, the sender can process the sending of information packets in accordance to process 400 of FIG. 4 described previously. Hence, the sender can adaptively adjust its transmission rate according to the process described above.

Multipath (MP) Communication

In embodiments, the AC-RLNC with FEC can be generalized to provide packet scheduling over heterogeneous multipath (MP) communication channels. In brief, the AC-RLNC for MP provides an adaptive coding solution with FEC for MP communications with delayed feedback. The AC-RLNC for MP is adaptive to the estimated channel condition and is causal as the coding adjusts the retransmission rates using a priori and posteriori algorithms. To achieve a desired throughput and delay, the AC-RLNC incorporates an adaptive packet allocation process or set of rules for retransmission across the available resources of the paths. More particularly, this approach utilizes a discrete water filling process (i.e., bit-filling), but, with two discrete objectives, which are to maximize throughput and minimize delay.

In the discussion of the AC-RLNC for MP that follows, unless context dictates otherwise, it will be assumed that the MP communication is between a sender and a receiver over a MP channel with P paths. At each time slot t, the sender transmits over each path p∈{1, . . . , P} a coded packet $c_{t,p}$. Each coded packet may include a negligible size header that contains transmission information. The forward paths between the sender and the receiver may be assumed to be independent binary erasure channels (BECs) where erasure events are i.i.d with probability $\epsilon_p$ for each p-th path. According to the erasure realizations, the receiver sends at each time slot either an acknowledgement (ACK) or a negative acknowledgement (NACK) message to the sender, using the same paths. For clarity, it will be assumed that feedback messages are reliable (i.e., without errors in the feedback).

As described previously, the delay between the transmission of a coded packet and the reception of the corresponding feedback may be referred to as round trip time (RTT). Defining $\rho_p$ as the rate of the forward path p in bits/second, and $|c_{t,p}|$ as the size of coded packet $c_{t,p}$ in bits, the maximum duration of a transmission can be defined as $$t_d = \max_{t,p} |c_{t,p}| / \rho_p.$$

Letting $t_p$ be the propagation time between the sender and the receiver in seconds and assuming the size of the feedback message is negligible compared to the size of coded packets, the RTT can be defined as RTT=$t_d$−2 $t_p$. Hence, for each transmitted coded packet $c_{t,p}$, the sender receives a ACK(t,p) or NACK(t,p) after RTT seconds.

In embodiments, with parameters ρ-th and RTT, an objective of AC-RLNC for MP is to maximize the throughput, η, while minimizing the in-order delivery delay, D.

Figure 6:
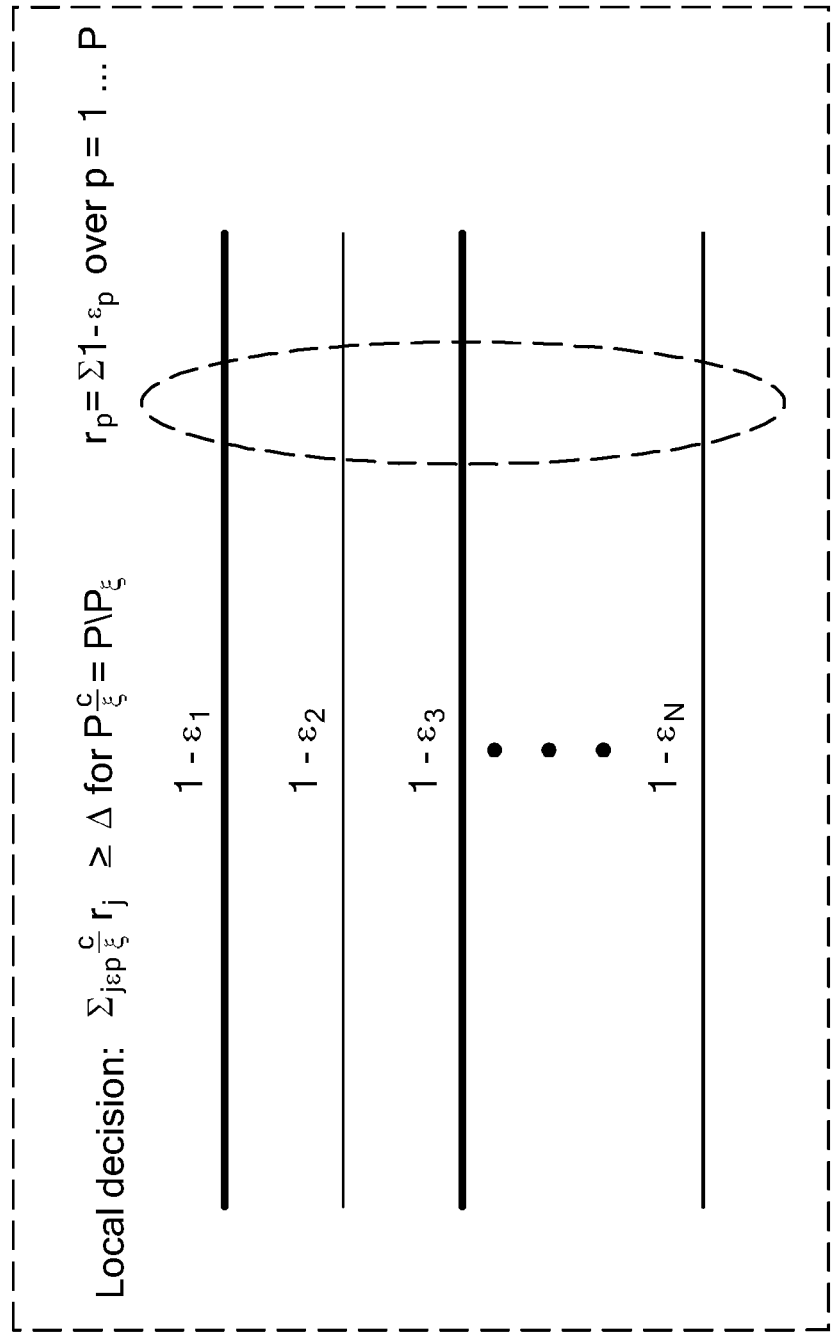
FIG. 6 shows a diagram illustrating a technique to improve packet allocation in a multipath (MP) communication, in accordance with an embodiment of the present disclosure.

Referring now to FIG. 6, shown is a diagram illustrating an example technique to improve (and ideally optimize) packet allocation in an MP communication. In this example, the AC-RLNC for MP communication utilizes a bit-filling packet allocation process. The allocation process includes a "global" decision portion (or component) and a "local" decision portion (or component). According to the AC-RLNC for MP, the sender first makes a global decision as to whether retransmission is needed. This global decision may be made according to (i.e., based on) the estimated rates of the paths $r_p$ (e.g., the total rate of all the paths being considered). Then, if the sender determines that retransmission is needed, the sender can make a local decision to determine which paths to send new packets of information and which paths to send retransmissions according to the modified bit-filling, which will be further described below.

In an embodiment, the global decision processing includes computing or otherwise determining an estimate of the total rate $r_P$, and checking the $r_P$ against a throughput-delay tradeoff parameter th (i.e., an adaptive threshold). If the total rate $r_P$ satisfies (e.g., is at least or above) the adaptive threshold th and the rate of missing DoF d (i.e., the retransmission criterion $r_P-d>$th is satisfied), the sender can continue to send (e.g., transmit) new information packets over all of the paths P. Otherwise, if the total rate $r_P$ does not satisfy (e.g., is below) the adaptive threshold th and the rate of missing DoF d (i.e., the retransmission criterion $r_P-d>$th is not satisfied), the sender can perform local decision processing to determine which paths to send new packets of information and which paths to send retransmissions. In other words, if there is a DoF gap rate, $\Delta$, the sender can perform retransmissions of FB-FECs on one or more of the paths. Here, the DoF gap rate, $\Delta$, can serve as the retransmission criterion and can be defined as $\Delta=P\cdot(d-1-th)>0$, where P is the number of paths.

In more detail, similar to the case of a point-to-point communication channel described herein, the AC-RLNC for MP includes an a priori FEC mechanism and posteriori FEC mechanism. According to the a priori FEC mechanism (FEC), after the transmission of $k=P(RTT-1)$ new RLNCs, the sender sends $m_p=\lfloor \epsilon_p(RTT-1) \rfloor$ FECs on the p-th path. The a priori FEC mechanism allows the sender to provide a sufficient number of DoFs to the receiver by balancing the expected number of erasures. Note that $m_p$ may vary from path to path according to the estimated erasure probability of each path.

The retransmission criterion of the posteriori FEC mechanism (FB-FEC) reflects, at the sender's knowledge (and ideally best knowledge), the ability of the receiver to decide RLNCs. Letting $md_g$ be the number of missing DoFs (i.e., the number of new coded packets that have been erased) and $ad_g$ be the number of added DoFs (i.e., the number of repeated RLNCs that have reached the receiver), the retransmission criterion can be expressed as $md_g>ad_g$. Indeed, if the number of erased new packets is not balanced by enough repetitions, then decoding may not be possible. However, the sender may not be able to compute exact values for $md_g$ and $ad_g$ due to the RTT delay. For instance, at time slot t, the sender can only compute accurately $md_g$ and $ad_g$ for the RLNCs sent before $t^-=t-RTT$, where $t^-$ is the time slot of the delayed feedback. These are the RLNCs that have feedback acknowledgements. But for the RLNCs sent between $t^-$ and t, the sender can only estimate the values for $md_g$ and $ad_g$ based on, for instance, the average rate of each path.

In embodiments, $md_g$ can be defined as $md_g=md_1+md_2$ and $ad_g$ can be defined as $ad_g=ad_1+ad_2$, where $md_1$ and $ad_1$ correspond to the RLNCs with feedback acknowledgements and $md_2$ and $ad_2$ correspond to the RLNCs without feedback acknowledgements. Here, $md_g$ and $ad_g$ can be computed using the following equations:

$$md_1=|\mathcal{N}\cap\mathcal{C}^n\cap\mathcal{U}|, md_2=\Sigma_{p=1}^P \epsilon_p|\mathcal{P}_p\cap\mathcal{C}^n\cap\mathcal{F}\cap\mathcal{U}| \quad [17]$$

$$ad_1=|\mathcal{A}\cap\mathcal{C}^r\cap\mathcal{U}|, ad_2=\Sigma_{p=1}^P \epsilon_p|\mathcal{P}_p\cap\mathcal{C}^r\cap\mathcal{F}\cap\mathcal{U}| \quad [18]$$

where:
$\mathcal{C}^r$ is the set of repeated RLNCs;
$\mathcal{C}^n$ is the set of new RLNCs;
$\mathcal{A}$ is the set of RLNCs with ACK feedback;
$\mathcal{N}$ is the set of RLNCs with NACK feedback;
$\mathcal{F}$ is the set of RLNCs that do not have a feedback yet;
$\mathcal{U}$ is the set of RLNCs that still depend on undecoded packets;
$\mathcal{S}_p$ is the set of RLNCs sent on path p; and
$|\mathcal{P}|$ denotes the cardinality of set $\mathcal{S}$.
Note that $\mathcal{C}=\mathcal{C}^r\cup\mathcal{C}^n=\mathcal{A}\cup\mathcal{N}\cup\mathcal{F}$.

Defining the DoF rate as $d=md_g/ad_g$, and using a tunable parameter th, the retransmission criterion can be re-expressed as $d-1>$th. Defining the DoF rate gap $\Delta$ as $\Delta=P\cdot(d-1-th)$, the FB-FEC may be specified as follows:

$$\text{FB-FEC: retransmission} \Leftrightarrow \Delta>0. \quad [19]$$

The check of the retransmission criterion (i.e., DoF rate gap $\Delta>0$) can be considered the global decision.

In embodiments, the sender may determine which paths to send new packets of information and which paths to send retransmissions of FB-FECs based on a discrete bit-filling process configured to maximize throughput and minimize delay. According to the utilized bit-filling process, the throughput is increased (and ideally maximized) through the allocation of new coded packets while the in-order delay is reduced through FB-FEC retransmissions.

The set of all the P paths may be defined as $\mathcal{P}$, and the index of all the possible subsets may be defined as $\xi \in \{1, \ldots, 2^P\}$. Further, the subset of paths over which the sender will transmit the new coded packets of information may be denoted as $P_\xi$, and the possible subsets of paths over which the sender will transmit the retransmissions of FB-FEC packets may be denoted as $$P_\xi^c.$$

In embodiments, given the estimates of all the paths, $r_p$ with $p \in \{1, \ldots, P\}$, the sender may increase (and ideally maximize) the throughput of the new packets of information, such that, $$\operatorname*{argmax}_{(P_\xi)} \sum_{i \in P_\xi} r_i, \quad [20]$$

$$\text{s.t.} \sum_{j \in P_\xi^c} r_j \geq \Delta \text{ for } P_\xi^c = \mathcal{P}\backslash P_\xi,$$

where the optimization problem minimizes the in-order delivery delay by providing over the selected paths (i.e., determined paths) a sufficient number of DoFs for decoding. In expression [20], $$\sum_{j \in P_\xi^c} r_j \geq \Delta \text{ for } P_\xi^c = \mathcal{P}\backslash P_\xi$$

can be considered the local decisions.

Note that by tuning the parameter th, it may be possible to obtain the desired throughput-delay tradeoff. Moreover, to increase (and ideally optimize) the performance of the AC-RLNC for MP, the optimization problem expressed in [20] may be solved only when the estimation of the rates changes. To this end, in an embodiment, once the number of paths in the MP communication reaches a threshold (e.g., a high number), the optimization problem expressed in [20] may be relaxed, for example, using one or more knapsack problem algorithms In embodiments, the sender may upper bound the achieved throughput in the MP network. For example, in an implementation, the achieved throughput in the MP network may be upper bounded with zero error probability by generalizing the techniques used to upper bound the throughput for point-to-point networks as described variously herein. More particularly, in the AC-RLNC for MP process, the sender follows the retransmission criterion as expressed in [19], which may be computed or otherwise determined according to the acknowledgements provided by the feedback channel, Yet, due to the transmission delay, those acknowledgements are obtained at the sender with a delay of RTT. Thus, the estimated rates of the paths may be different from the actual rates of the paths.

As an example, consider the case for which the actual sum-rate of the paths at time slot t $$\left(\text{i.e.,} \sum_{p=1}^{P} r_p(t)\right)$$

is higher than the estimated rate at the sender side $$\left(\text{i.e.,} \sum_{p=1}^{P} r_p(t^-)\right)$$

with $t^-=t-RTT$). In this case, throughput may be spoilt as coded retransmissions will be sent while not being necessary for the decoding. $c_p=c_{t^-,p}, \ldots, c_{t,p}$) denotes the vector of the coded packets transmitted on the p-th path according to the retransmission criterion given the estimated rate $r_p(t^-)$. $c'_p=c'_{t^-,p}, \ldots, c'_{t,p}$) denotes the vector of the coded packets transmitted on the p-th path according to the retransmission criterion given the actual rate $r_p(t)$ available at the sender non-causally.

In embodiments, to upper bound the throughput, the distance between the realization during one RTT period given the actual rate and calculated (i.e., estimated) rate at each path is bounded by a minimum Bhattacharyya distance. Given a probability density function W(y) defined on a domain γ, the Bhattacharyya distance between two sequences $c_p$ and $c'_p$ is given by $l(c_p, c'_p)=-\ln(BC(c_p, c'_p))$, where $BC(c_p, c'_p)$ is the Bhattacharyya coefficient, which is defined as $$BC(c_p, c'_p) = \sum_{y \in r} \sqrt{W(y \mid c_p)W(y \mid c'_p)},$$

with $W(y|c_p)$ and $W(y|c'_p)$ corresponding to W(y) conditioned on the sequences $c_p$ and $c'_p$, respectively. In an embodiment, based on the Bhattacharyya distance, an upper bound on the throughput of the AC-RLNC in the MP network may be given as:

$$\eta \leq \sum_{p=1}^{P} r_p(t^-) - l(r_p(t), r_p(t^-)), \quad [21]$$

where $l(\cdot,\cdot)$ is the Bhattacharyya distance.

In embodiments, the throughput η may be upper bounded by the sum of the upper bounds for each individual path p as described previously with respect to the point-to-point channels. More particularly, given the calculated rate $r_p(t^-)$, the actual rate of each path in the MP network at time slot t can be bounded by $$r_p(t) \leq r_p(t^-) + \frac{\sqrt{V_p(t)}}{RTT - 1 + m_p}, \quad [22]$$

where $V_p(t)$ denotes the variance of each path during the period of RTT. Using the summation range in $$BC(c_p, c'_p) = \sum_{y \in r} \sqrt{W(y \mid c_p)W(y \mid c'_p)}$$

to be from t=0 to RTT−1, and letting $W(y|c'_p)=r_p(t^-)$ and $$W(y \mid c_p) = r_p(t), \eta \leq \sum_{p=1}^{P} r_p(t^-) - l(r_p(t), r_p(t^-))$$

(i.e., relation [21] above).

In embodiments, the sender may upper bound the mean in-order delivery delay. As described previously, for point-to-point channels, the number of distinct information packets in $c_t$ may be bounded by $\bar{o}$. Hence, for the analysis of the mean in-order delay, the end of a window of a packets may be considered.

In the case of an MP network, the retransmission criterion FB-FEC: retransmission⇔Δ>0 reflects the sender's estimate (and in some cases the sender's best estimate) of the total number of erased packets, taking into account all the paths. Hence, the average erasure probability of the MP network $\bar{\epsilon}$ can be defined as $$\bar{\epsilon} = \frac{1}{P}\sum_{p=1}^{P} \epsilon_p.$$

Hence, in a similar manner the throughput is bounded, the maximum of the mean erasure rate $\bar{\epsilon}_{max}$ can be bounded as $$\bar{\epsilon}_{max} \leq \bar{\epsilon} + \frac{\sqrt{\bar{V}}}{2RTT} = \bar{\epsilon} + \frac{\sqrt{RTT(1-\bar{\epsilon})\bar{\epsilon}}}{2RTT}, \quad [23]$$

where $\bar{V}$ denotes the average variance during the period of 2RTT. In the BEC, $$\overline{V} = \sqrt{2RTT(1-\overline{\epsilon})\overline{\epsilon}}.$$

Using a technique similar to that described herein for the point-to-point (i.e., single path) scenario, the mean in-order delivery delay of a virtual path can be upper bounded using the average erasure probability of the MP network. Here, a virtual path refers to a grouping of one or more paths. That is, for a virtual path, the number of new packets sent over one window on this virtual path, $k_p$, may be defined as $k_p = k/P$, and the effective number of DoFs needed by the receiver, $m_e$, may be defined as $m_e = \overline{o}\overline{\epsilon} = 2 k_p \overline{\epsilon}$. The technique similar to that described herein for the single path scenario may then be applied to the virtual path.

However, in order to determine upper bounds for the mean in-order delivery delay, the probability that it is EoW for the virtual path and the probability that $\Delta > 0$ for the virtual path need to be determined. The probability that it is EoW for a virtual path, which is the condition for starting a new generation, can be computed as $\mathbb{P}_{E\overline{o}W} = (1-\overline{\epsilon})^{\overline{o}}$. The probability that $\Delta > 0$ for the virtual path can be computed as $$\mathbb{P}_{\Delta < 0} = \sum_{i=1}^{\lfloor \overline{o}\overline{\epsilon}_{max} \rfloor} \binom{\overline{o}}{i} \overline{\epsilon}^i (1-\overline{\epsilon})^{\overline{o}-i}.$$

Having determined $\mathbb{P}_{E\overline{o}W}$ and $\mathbb{P}_{\Delta<0}$, upper bounds for the mean in-order delay for BEC can be derived under the different feedback states no feedback, NACK feedback, and ACK feedback. Note that as the paths are grouped together in one virtual path, the meaning of NACK and ACK is replaced with an equivalent notion of average NACK and average ACK.

In the case of no feedback in the virtual path, the mean in-order delivery delay, $D_{mean[no\ feedback]}$, for the virtual path is as follows:

$$D_{mean[no\ feedback]} \leq \frac{1}{1-\overline{\epsilon}_{max}}[\mathbb{P}_{E\overline{o}W}(m_e + k) + (1 - \mathbb{P}_{E\overline{o}W})RTT]. \qquad [24]$$

In the case where the feedback message is an equivalent NACK for the virtual path, the mean in-order delivery delay, $D_{mean[nack\ feedback]}$, for the virtual path is as follows:

$$D_{mean[no\ feedback]} \leq \qquad [25]$$
$$\overline{\epsilon}_{max} \frac{1}{1-\overline{\epsilon}_{max}} \begin{bmatrix} \mathbb{P}_{\Delta<0}[(1-\mathbb{P}_{E\overline{o}W})RTT + \mathbb{P}_{E\overline{o}W}(m_e + k_p)] + \\ (1-\mathbb{P}_{\Delta<0})[RTT + \mathbb{P}_{E\overline{o}W}(m_e + k_p)] \end{bmatrix}.$$

In the case where the feedback message is an equivalent ACK for the virtual path, the mean in-order delivery delay, $D_{mean[ack\ feedback]}$, for the virtual path is as follows:

$$D_{mean[ack\ feedback]} \leq (1-\overline{\epsilon}_{max})[\mathbb{P}_{E\overline{o}W}(m_e + k_p) + (\mathbb{P}_{\Delta<0})RTT + (1-\mathbb{P}_{\Delta<0})RTT]. \qquad [26]$$

Grouping together relations [24], [25], and [26] above, the mean delay $D_{mean}$ is bounded by $$D_{mean} \leq \lambda D_{mean[no\ feedback]} + (1-\lambda)(D_{mean[nack\ feedback]} + D_{mean[ack\ feedback]}), \qquad [27]$$

where $\lambda$ denotes the fraction of time without feedback compared to the total time of transmission.

In embodiments, the sender may upper bound the maximum in-order delivery delay. Contrarily to the bounding techniques described previously for the throughput and the mean in-order delivery delay, the bound for the maximum in-order delivery delay cannot be bounded using a technique similar to that described herein for the point-to-point (i.e., single path) scenario as the single path maximum in-order delivery delay bounds cannot be readily generalized to the MP network.

For example, considering the transmission of a new generation of raw packets, the decoding of the first packet can occur at four different times or moments (ranked from the earliest to the latest): (1) after the first transmission; (2) after a FEC transmission; (3) after a FB-FEC transmission; and (4) after a transmission due to the size-limit mechanism. The size-limit mechanism is the maximum possible window size (i.e., the maximum number of new information packets in a window). In a worst case approach, the FEC and FB-FEC mechanisms can be neglected, and the transmissions occur such that a first transmissions each contain a new packet of information. Once a size limit is reached, the same RLNC is sent until successful decoding after T transmissions.

Given an error probability $P_e$, the number of transmissions $T_{max}$ needed to decode the first packet with probability $1-P_e$ can be defined as $T_{max}$ s.t. $\mathbb{P}[T > T_{max}] \leq P_e$. Decoding of the first packet is not possible after $T_{max}$ transmissions if two conditions are satisfied: (1) the first transmission is erased; and (2) among the $T_{max}-1$ remaining transmissions, at most $\overline{o}-1$ successful transmissions occur (or stated another way, at least $T_{max}-\overline{o}$ erasures occur). Indeed, once the first packet is erased, no decoding is possible before reaching the size limit, as the number of received RLNCs will always be at least one step behind the number of raw packets coded in the RLNC. Hence, the $\overline{o}$ packets are decoded jointly. Letting $E_i$ be the random variable equal to 1 if the ith transmission is erased and 0 otherwise, the probability of no-decoding can be bounded as:

$$\mathbb{P}[T > T_{max}] \leq \mathbb{P}[E_1]\mathbb{P}\left[\sum_{i=2}^{T_{max}} E_i \geq T_{max} - \overline{o}\right]. \qquad [28]]$$

Note that the inequality in [28] is due to the fact that the FEC and FB-FEC mechanisms are neglected.

Defining $$S_e \triangleq \frac{1}{T_{max}-1} \sum_{i=2}^{T_{max}} E_i,$$

$T_{max}$ can be identified through the cumulative distribution function (CDF) of that random variable, whose expectation is the average erasure probability of the MP network $\overline{\epsilon}$, as defined in $$\overline{\epsilon} = \frac{1}{P}\sum_{p=1}^{P} \epsilon_p.$$

However, since the erasure probability of each path may be different, $S_e$ is the average of independent, but not identically distributed, random variables. Hence, it follows a Poisson Binomial distribution whose CDF may become quickly difficult to compute in an efficient manner. Hence, in an embodiment, to obtain a closed-form expression of $T_{max}$, the Hoeffding inequality can be used to obtain the following:

$$\mathbb{P}\left[S_e \geq \frac{T_{max} - \bar{\sigma}}{T_{max} - 1}\right] \leq \exp\left(-2(T_{max} - 1)\left(\frac{T_{max} - \bar{\sigma}}{T_{max} - 1} - \bar{\epsilon}\right)^2\right). \quad [29]$$

Since $$\mathbb{P}[E_1] \leq \max_{p=1...P} \epsilon_p \triangleq \epsilon_{max},$$

requiring the upper bound of the probability of no-decoding as given in relation [28] above to be smaller than $P_e$, $T_{max}$ is such that $$(T_{max} - 1)\left(\frac{T_{max} - \bar{\sigma}}{T_{max} - 1} - \bar{\epsilon}\right)^2 \geq \frac{1}{2} \log\left(\frac{\epsilon_{max}}{P_e}\right). \quad [30]$$

Letting $\alpha = \log\left(\frac{\epsilon_{max}}{P_e}\right)$, $$T_{max} = \left\lceil 1 + \frac{\bar{\sigma} - 1}{1 - \bar{\epsilon}} + \frac{\alpha}{4(1-\bar{\epsilon})^2} + \frac{\sqrt{\alpha(\alpha + 4(1-\bar{\epsilon})(\bar{\sigma} - 1))}}{2} \right\rceil.$$

Hence, the maximum delay is bounded, with a probability $P_e$, as $$D_{max} \leq \left\lceil \frac{RTT}{2} \right\rceil + \left\lceil \frac{T_{max}}{P} \right\rceil,$$

with the RTT factor coming from the transmission time. It will be appreciated in light of this disclosure that one benefit lies in the average of the erasure probabilities, as $T_{max}$ grows rapidly when $\bar{\epsilon}$ is close to one. However, as $\bar{\epsilon}$ is the average erasure probability, the worst paths will be balanced by the better paths, hence pushing $\bar{\epsilon}$ away from one, and thus leading to smaller delays.

Figure 7:
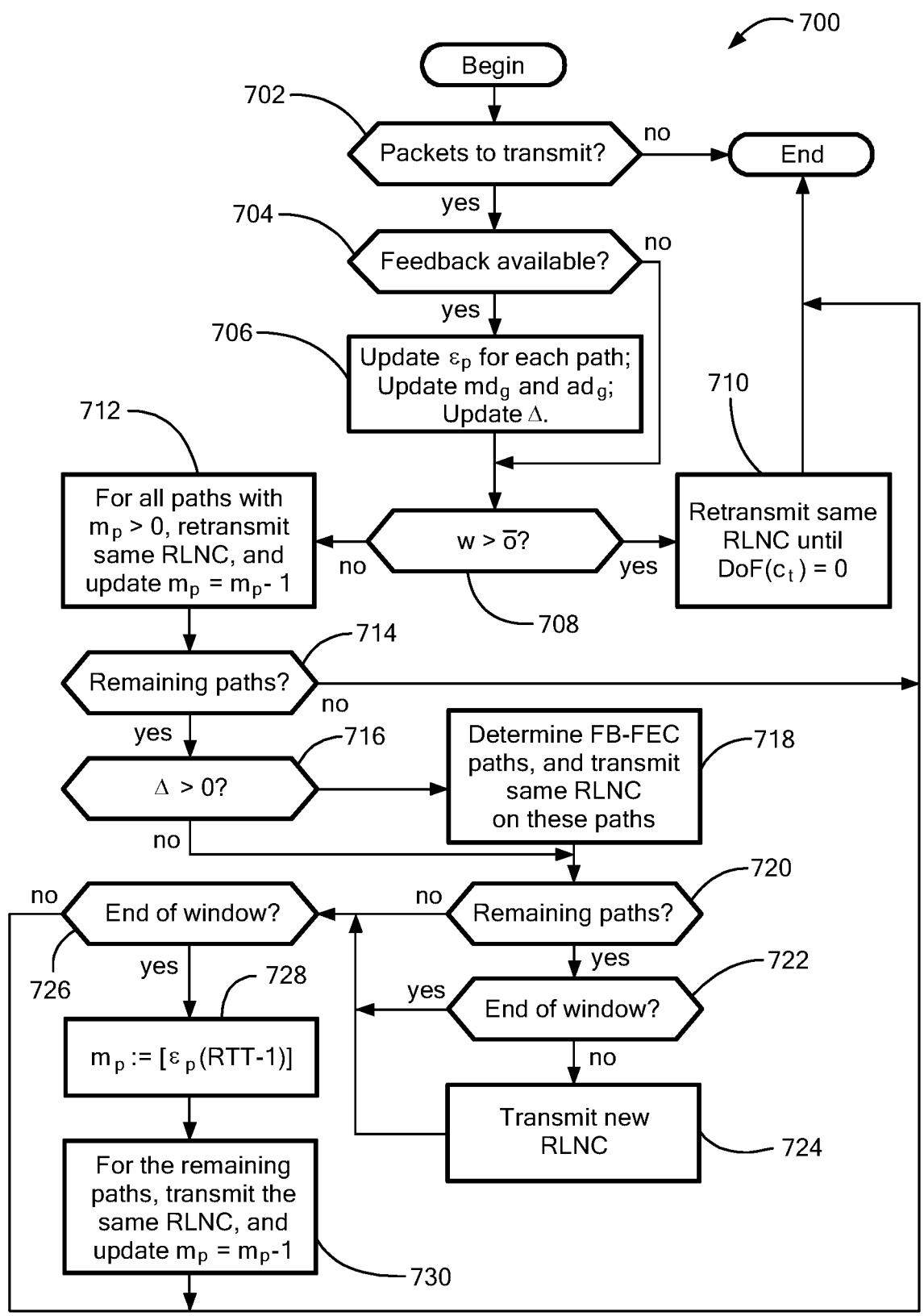
FIG. 7 is a flow diagram of an example adaptive and causal random linear network coding (AC-RLNC) process for multipath (MP) communication packet scheduling, in accordance with an embodiment of the present disclosure.

FIG. 7 is a flow diagram of an example adaptive and causal random linear network coding (AC-RLNC) process 700 for packet scheduling in multipath (MP) communication. In an example scenario, a sender may be scheduling packets for sending over a MP communication channel to a receiver.

With reference to FIG. 7, process 700 is initiated and, at 702, the sender checks to determine whether there is a coded packet to transmit to the receiver. If there are no more coded packets to transmit, the sender may end process 700.

Otherwise, if there is a coded packet to transmit, then, at 704, the sender checks to determine whether feedback is available. Here, the sender is checking to determine whether feedback has been provided by the receiver. If feedback is available, then, at 706, the sender updates the erasure probability ($\epsilon_p$) for each path in the MP communication between the sender and the receiver. The sender also updates the number of missing DoFs globally across all the paths being considered ($md_g$) and the number of added DoFs globally across all the paths being considered ($ad_g$). The sender also updates the DoF rate gap ($\Delta$).

Otherwise, if feedback is not available or after performing block 706, at 708, the sender checks to determine whether the effective window size exceeds the maximum window size, i.e., the maximum number of information packets allowed to overlap ($\mathcal{W} > \bar{o}$). If the effective window size exceeds the maximum window size, then, at 710, the sender retransmits the same RLNC until the DoF contained in $c_t$ is zero (DoF($c_t$)=0). The sender may then end process 700.

Otherwise, if the effective window size does not exceed the maximum window size, then, at 712, the sender retransmits the same RLNC on all the paths with the number of FECs larger than zero ($m_p > 0$). For these paths, the sender updates the number of FECs sent on the respective paths ($m_p = m_p - 1$).

At 714, the sender checks to determine whether there are any remaining paths that have not assigned any RLNC coded packets. If there are no remaining paths, the sender may end process 700. Otherwise, if there are remaining paths, then, at 716, the sender checks to determine whether the DoF rate gap is larger than zero ($\Delta > 0$). Here, the sender is checking to determine whether the retransmission criterion is satisfied. If the retransmission criterion is satisfied (i.e., retransmissions are needed), then, at 818, the sender determines the feedback paths (FB-FEC paths) and transmits the same RLNC on these feedback paths.

Otherwise, if the retransmission criterion is not satisfied (i.e., retransmissions are not needed) or after performing block 718, at 720, the sender checks to determine whether there are any remaining paths that have not yet an assigned RLNC for the current time slot. If there are remaining paths, then, at 722, the sender checks to determine whether the effective window ends with k new information packets. If the effective window does not end with k new information packets, then, at 724, the sender transmits a new RLNC on the path. Note that the sender performs block 722 and block 724 for each of the remaining paths determined in the check performed at block 720.

Otherwise, if the effective window ends with k new information packets for a remaining path and all the remaining paths have been processed, at 726, the sender checks to determine whether the effective window ends with k new information packets. If the remaining paths have not all been processed, the sender processes the next remaining path.

Otherwise, if there are no remaining paths or after performing block 722 or block 724 for the last remaining path, at 726, the sender checks to determine whether the effective window ends with k new information packets. If the effective window does not end with k new information packets, the sender may end process 700.

Otherwise, if at 726, it is determined that the effective window does not end with k new information packets, at 728, the sender sets the number of FECs sent on each path $m_p$ to $m_p = \lceil \epsilon_p (RTT-1) \rfloor$. Here, p corresponds to path p, $m_p$ is the number of FECs transmitted on path p which is determined by the erasure rate of path p, $\epsilon_p$, and RTT. Note that $m_p$ is being sent only on path p, and each path has its own $m_p$.

At 730, the sender transmits the same RLNC on the remaining paths. The remaining paths are the paths that have not yet been used. For these paths, the sender updates the number of FECs sent on the respective paths ($m_p = m_p - 1$). The sender may then end process 700.

Multi-Hop (MH) Multipath (MP) Communication

In embodiments, the AC-RLNC for MP can be generalized to provide packet scheduling over a multi-hop (MH) multipath (MP) setting. In the MH MP setting, the sender and receiver behave as in a single hop case (i.e., as in the MP setting). In brief, the MH MP packet allocation technique includes minimizing, and in some cases effectively eliminating, the bottleneck effect in each global path in a MH MP network to maximize the total rate $r_p$ of the network. In a MH network, the overall rate of a global path is defined by the worst rate of a local path of the global path.

In embodiments, packet allocation in a MH MP network may be improved (and ideally optimized) by minimizing, and in some instances effectively eliminating, the end-to-end (i.e., sender to receiver) bottleneck. This can be accomplished by each intermediate node pairing an incoming local path with an outgoing local path based on the rate of the incoming local path, such that the respective rates of the incoming local path and the paired outgoing local path are similar. This in effect minimizes the bottleneck effect at each intermediate node since each local path incoming to the intermediate node is paired to an outgoing local path that has a rate that closely matches the rate of the incoming local path. Minimizing the bottleneck effect at each intermediate node of a global path effectively minimizes the bottleneck effect in the global path.

In the discussion of the AC-RLNC for MH MP that follows, unless context dictates otherwise, it will be assumed that there are P paths in each hop $h \in \{1, \ldots, H\}$, each with i.i.d erasure probability $\epsilon_{p,h}$. At each time slot, each intermediate node $n_h$, $h \in \{1, \ldots, H-1\}$, receives from the h-th hop (and, therefore either from the sender for the first intermediate node or from the previous intermediate node for the other intermediate nodes) P coded packets from the independent paths. The intermediate node then sends P (possibly different) coded packets on the (h+1)-th hop (towards the next intermediate node or the receiver in the case of sending by the last intermediate node). For feedback acknowledgements, either a local hop-by-hop mechanism (from node to node) or a global mechanism (feedback directly from the receiver to the sender) can be utilized. Letting $t_{p,h}$ be the propagation delay of one hop, in seconds, and assuming all hops have the same propagation delay, the propagation time $t_p$ can be defined as $t_p = H t_{p,h}$.

In embodiments, with parameters p-th and RTT, an objective of AC-RLNC for MH MP is to maximize the throughput, $\eta$, while minimizing the in-order delivery delay, D.

Figure 8A:
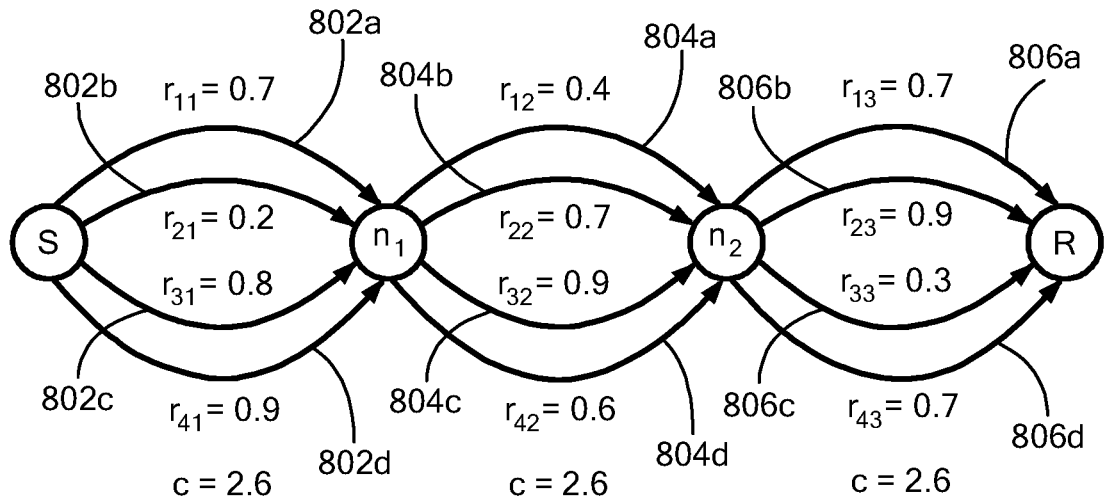
FIGS. 8A and 8B are diagrams illustrating an example of path pairing by intermediate nodes in a multi-hop (MH) multipath (MP) communication, in accordance with an embodiment of the present disclosure.
Figure 8B:
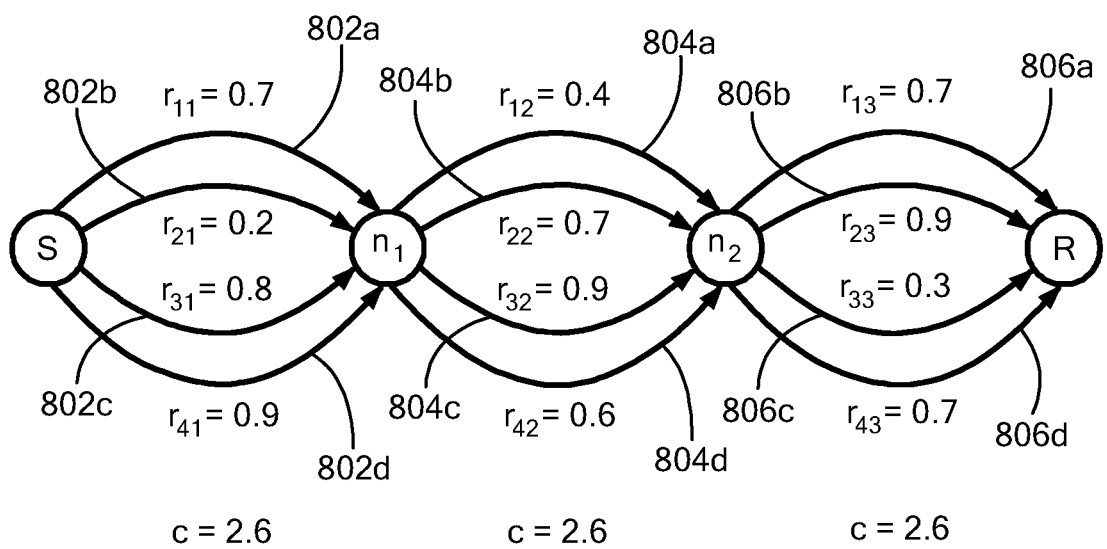

Referring now to FIGS. 8A and 8B, shown are diagrams illustrating an example path pairing by intermediate nodes in a MH MP communication, in accordance with an embodiment of the present disclosure. As shown, the illustrative MH MP network includes a sender node (designated as "S"), a receiver node (designated as "R"), and two intermediate nodes (designated as "$n_1$" and "$n_2$"), where intermediate node $n_2$ follows intermediate node $n_1$. As can be seen in FIGS. 8A and 8B, there are four global paths from node S to node R, and each global path is shown to include three hops, wherein a first hop is from node S to intermediate node $n_1$, a second hop is from intermediate node $n_1$ to intermediate node $n_2$, and a third hop is from intermediate node $n_2$ to node R. While only three hops are illustrated in FIGS. 8A and 8B for purposes of clarity, it will be appreciated that each global path can include a different number of hops, and in some instances a very large number of hops. Similarly, while only four global paths are illustrated in FIGS. 8A and 8B for purposes of clarity, it will be appreciated that there may be a different number of global paths, such as, by way of example and not a limitation, two global paths, three global paths, five global paths, or a larger number of global paths, from node S to node R.

In the example shown in FIGS. 8A and 8B, using RLNC, the min-cut max-flow capacity c=2.6 can be achieved by mixing together coded packets from all the paths at each intermediate node. Hence, one technique may specify using P parallel point-to-point (i.e., single path) AC-RLNC protocols with the node recoding protocol to achieve a throughput that is close to the min-cut max-flow capacity. However, due to the mixing between the paths, dependencies are introduced between the FECs and the new RLNCs. This may result in a high in-order delay.

To reduce the in-order delay, the AC-RLNC for MP described previously can be used on the P global paths, using RLNC independently on each path. FIG. 8A shows a naïve selection of global paths. As shown in FIG. 8A, a first global path is comprised of local paths 802a, 804a, and 806a, a second global path is comprised of local paths 802b, 804b, and 806b, a third global path is comprised of local paths 802c, 804c, and 806c, and a fourth global path is comprised of local paths 802d, 804d, and 806d. Local path 802a has a rate $r_{11}=0.7$, local path 804a has a rate $r_{12}=0.4$, local path 806a has a rate $r_{13}=0.7$, local path 802b has a rate $r_{21}=0.2$, local path 804b has a rate $r_{22}=0.7$, local path 806b has a rate $r_{23}=0.9$, local path 802c has a rate $r_{31}=0.8$, local path 804c has a rate $r_{32}=0.9$, local path 806c has a rate $r_{33}=0.3$, and local path 802d has a rate $r_{41}=0.9$, local path 804d has a rate $r_{42}=0.6$, local path 806d has a rate $r_{43}=0.7$. In the illustrated setting, due to the min-cut max-flow capacity, the maximum throughput of each path is limited by its bottleneck (i.e., the link with the smallest rate). In the illustrated example, the bottleneck of the first global path is local path 804a having the rate $r_{12}=0.4$, the bottleneck of the second global path is local path 802b having the rate $r_{21}=0.2$, the bottleneck of the third global path is local path 806c having the rate $r_{33}=0.3$, and the bottleneck of the fourth global path is local path 804d having the rate $r_{42}=0.6$. Hence, the achieved throughput (i.e., the sum of the min-cut of each path) is $\eta = r_{12}+r_{21}+r_{33}+r_{42}=1.5$, which may be much lower than the capacity of the network.

Based on the foregoing, in embodiments, the global paths in a MH MP communication may be determined using a decentralized balancing algorithm whose objective is to maximize the maximal throughput of the network. To this end, each intermediate node pairs an incoming local path with an outgoing local path based on the rate of the incoming local path, such that the respective rates of the incoming local path and the paired outgoing local path are similar. FIG. 8B shows an example of the global paths resulting from such balancing optimization. As shown in FIG. 8B, after such balancing optimization, a first global path is comprised of local paths 802a, 804b, and 806a, a second global path is comprised of local paths 802b, 804a, and 806c, a third global path is comprised of local paths 802c, 804d, and 806d, and a fourth global path is comprised of local paths 802d, 804c, and 806b. After the optimization, the bottleneck of the first global path can be any one of local paths 802a, 804b, and 806a since these local paths have the same rate (i.e., $r_{11}=0.7$, $r_{22}=0.7$, and $r_{13}=0.7$), the bottleneck of the second global path is local path 802b having the rate $r_{21}=0.2$, the bottleneck of the third global path is local path 804d having the rate $r_{42}=0.6$, and the bottleneck of the fourth global path can be any one of local paths 802d, 804c, and 806b since these local paths have the same rate (i.e., $r_{11}=0.9$, $r_{32}=0.9$, and $r_{23}=0.9$). Hence, the maximum throughput (i.e., the sum of the min-cut of each path) is $\eta_{max}=r_{11}+r_{21}+r_{42}+r_{41}=2.4$. Note that only two of the four global paths (i.e., the second global path and the third global path) are now affected by the bottleneck links. In other words, the first and fourth global paths do not have a bottleneck link since the rates of the local paths in the first and fourth global paths are the same. Once these global paths are found, the AC-RLNC for MP as described previously can be used to allocate packets on the MH MP network.

In more detail, in embodiments, in order for the h-th intermediate node to transmit packets over the paths maximizing the rate, it needs to know the local matching L(p,h), such that L(p,h)=j implies that the j-th path of the (h+1)-th hop is matched with the p-th path of the h-th hop. The global paths can be defined similarly through a global matching G(p,h), such that G(p,h)=j implies that the j-th path of the h-th hop belongs to the p-th global path. The global matching of the first hop is such that the p-th local path belongs to the p-th global path (i.e., $G(p, 1)=p \forall p=1 \ldots P$). It will be appreciated in light of this disclosure that, even if these two definitions are equivalent, the local matching is particularly convenient to express the global paths in a decentralized manner. Moreover, note that, for L and G to be an admissible matching, each local path needs to be matched with exactly one other local path at each intermediate node. Hence, $\mathcal{L}$ is defined as the set of admissible local matchings and $\mathcal{G}$ is defined as the set of admissible global matchings. In the example of FIGS. 8A and 8B, the values of L and G are as follows:

$$L = \begin{bmatrix} 1 & 2 & 3 \\ 2 & 1 & 1 \\ 3 & 4 & 2 \\ 4 & 3 & 4 \end{bmatrix} \text{ and } G = \begin{bmatrix} 1 & 2 & 1 \\ 2 & 1 & 3 \\ 3 & 4 & 4 \\ 4 & 3 & 2 \end{bmatrix}.$$

Once admissible global paths are determined, the maximum achievable throughput $\eta_{max}$ can be computed as the sum of the min-cut of each global path.

Defining $r_{G(p,h)h}$ as the rate of the G(p,h)-th path of the h-th hop, $\eta_{max}$ can be expressed as $$\eta_{max}(G) = \sum_{p=1}^{P} \min_{h=1\ldots H} r_{G(p,h)h}. \quad [31]$$

Consequently, since G and L are equivalent, the global path problem can be expressed as $$L = \underset{\overline{L} \in \mathcal{L}}{\text{argmax }} \eta_{max}(\overline{L}).$$

Note that the global path problem may provide in general more than one solution, as can be seen in FIG. 8B. For instance, letting Local path 802a ($r_{11}$=0.7) be matched with local path 804d ($r_{42}$=0.6) and local path 802c ($r_{31}$=0.8) be matched with local path 804b ($r_{22}$=0.7), $\eta_{max}$ is unchanged.

Figure 9:
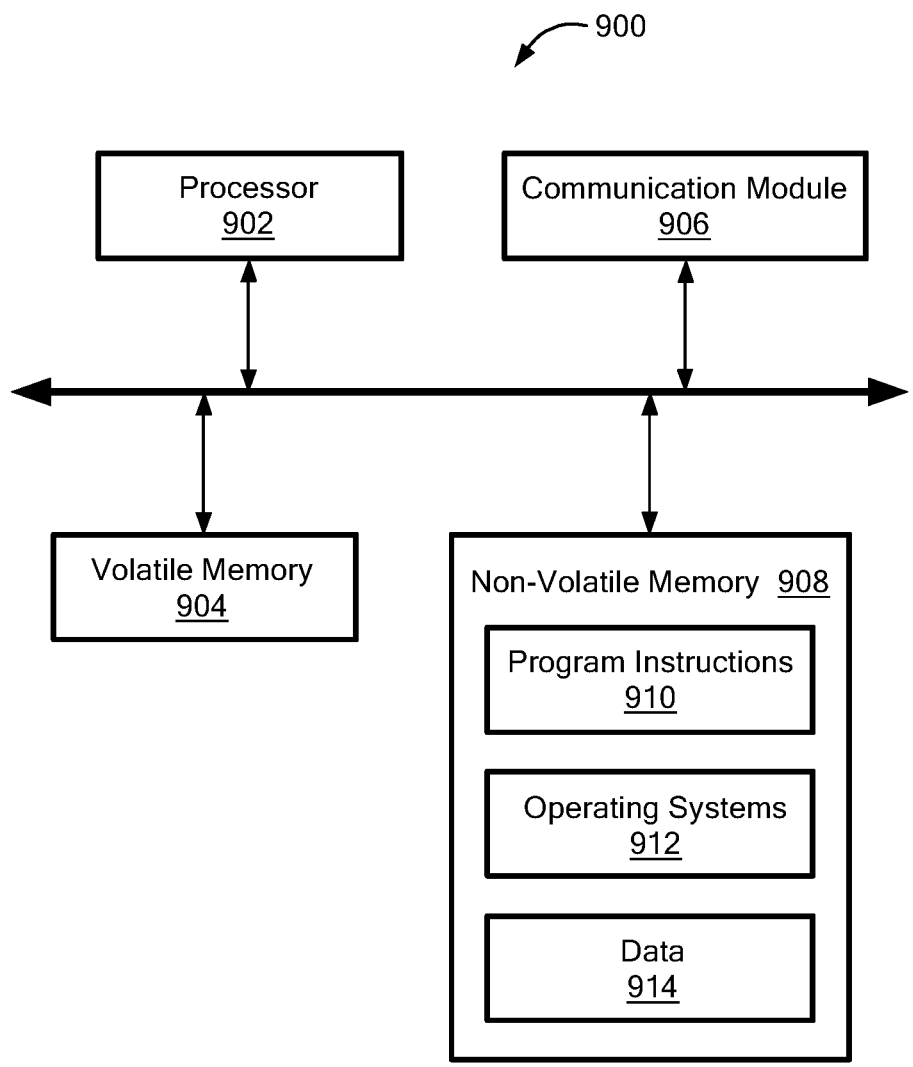
FIG. 9 is a block diagram illustrating selective components of an example computing device in which various aspects of the disclosure may be implemented, in accordance with an embodiment of the present disclosure.

FIG. 9 is a block diagram illustrating selective components of an example computing device 900 in which various aspects of the disclosure may be implemented, in accordance with an embodiment of the present disclosure. In various implementations, computing device 900 may be a network system or a network node. As shown in FIG. 9, computing device 900 includes a processor 902, a volatile memory 904 (e.g., random access memory (RAM)), a communication module 906, and non-volatile memory 908. Processor 902, volatile memory 904, communication module 906, and non-volatile memory 908 may be communicatively coupled. In various embodiments, additional components (not illustrated, such as a display, communication interface, input/output interface, etc.) or a subset of the illustrated components can be employed without deviating from the scope of the present disclosure.

Non-volatile memory 908 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 908 stores program instructions 910, an operating system 912, and data 914 such that, for example, computer instructions of operating system 912 and/or program instructions 910 are executed by processor 902 out of volatile memory 904. For example, in embodiments, program instructions 910 and data 914 may cause computing device 900 to implement functionality in accordance with the various embodiments and/or examples with respect to the AC-RLNC described herein. In embodiments, volatile memory 904 may include one or more types of RAM and/or a cache memory that may offer a faster response time than a main memory.

Processor 902 may be implemented by one or more programmable processors to execute one or more executable instructions, such as program instructions 910 and/or a computer program, to perform or direct performance of any number of operations described in the present disclosure. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In embodiments, processor 902 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. Processor 902 may be analog, digital or mixed signal. In embodiments, processor 902 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication module 906 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 906 can also be configured to provide intra-device communications via a bus or an interconnect.

The processes described herein (e.g., processes 400 and/or 800) are not limited to use with hardware and software of computing device 900 of FIG. 9. Rather, the processes may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product (e.g., in a non-transitory machine-readable storage medium such as, for example, a non-transitory computer-readable medium) for execution by, or to control the execution of, data processing apparatus (e.g., a programmable processor, a computer, or multiple computers). Each such program may be implemented in a high-level procedural, functional, or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed one computer or multiple computers at one site or distributed across multiple sites and interconnected by a communication network. A computer program may be stored on a non-transitory machine-readable medium or device that is readable by a general or special purpose programmable computer for configuring and operating the computer when the non-transitory machine-readable medium or device is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disk, flash memory, non-volatile memory, volatile memory, magnetic diskette, and so forth but does not include a transitory signal per se.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer implemented method to provide adaptive causal network coding in a multipath (MP) communication channel, the method comprising:
   transmitting, by a sender, one or more coded packets in a multipath (MP) communication channel comprising a plurality of paths, wherein a coded packet is a combination of a subset of information packets within a sliding window, wherein a size of the sliding window is determined by at least a round trip time (RTT) and a maximum number of information packets that are allowed to overlap within the sliding window;
   determining an estimate of a total rate of the plurality of paths; and
   responsive to a determination that a retransmission is needed,
      determining at least a first path of the plurality of paths on which to send a new coded packet of information that includes an adaptively adjusted number of information packets from the sliding window based on the estimate of the total rate of the plurality of paths; and
      determining at least a second path of the plurality of paths on which to send a retransmission of a forward error correction (FEC) packet;
   wherein determination that a retransmission is needed is based on the estimate of the total rate of the plurality of paths.

2. The method of claim 1, wherein determination that a retransmission is needed is based on a check of the estimate of the total rate against a retransmission criterion.

3. The method of claim 1, wherein the estimate of the total rate is determined based on feedback acknowledgements received by the sender.

4. The method of claim 1, wherein determining at least the first path and determining at least the second path is via a bit-filling process configured to maximize throughput and minimize delay on the MP communication channel.

5. The method of claim 1, wherein the new coded packet is a random linear combination of one or more information packets.

6. The method of claim 1, wherein the FEC packet is a random linear combination of one or more information packets.

7. A computing device comprising:
   a processor; and
   a non-volatile memory storing computer program code that when executed on the processor causes the processor to execute a process including:
      transmitting one or more coded packets in a multipath (MP) communication channel comprising a plurality of paths, wherein a coded packet is a combination of a subset of information packets within a sliding window, wherein a size of the sliding window is determined by at least a round trip time (RTT) and a maximum number of information packets that are allowed to overlap within the sliding window;
      determining an estimate of a total rate of the plurality of paths; and
      responsive to a determination that a retransmission is needed,
         determining at least a first path of the plurality of paths on which to send a new coded packet of information that includes an adaptively adjusted number of information packets from the sliding window based on the estimate of the total rate of the plurality of paths; and
         determining at least a second path of the plurality of paths on which to send a retransmission of a forward error correction (FEC) packet;
      wherein determination that a retransmission is needed is based on the estimate of the total rate of the plurality of paths.

8. The computing device of claim 7, wherein determination that a retransmission is needed is based on a check of the estimate of the total rate against a retransmission criterion.

9. The computing device of claim 7, wherein the estimate of the total rate is determined based on feedback acknowledgements received by the computing device.

10. The computing device of claim 7, wherein determining at least the first path and determining at least the second path is via a bit-filling process configured to maximize throughput and minimize delay on the MP communication channel.

11. The computing device of claim 7, wherein the new coded packet is a random linear combination of one or more information packets.

12. The computing device of claim 7, wherein the FEC packet is a random linear combination of one or more information packets.

* * * * *